United States Patent
Peto

(10) Patent No.: US 8,796,966 B2
(45) Date of Patent: Aug. 5, 2014

(54) MOTOR CONTROLLER AND RELATED METHOD

(76) Inventor: Raymond John Peto, Dorchester (GB)

(*) Notice: Subject to any disclaimer, the term of this patent is extended or adjusted under 35 U.S.C. 154(b) by 167 days.

(21) Appl. No.: 13/138,966

(22) PCT Filed: May 12, 2010

(86) PCT No.: PCT/GB2010/000928
§ 371 (c)(1),
(2), (4) Date: Dec. 23, 2011

(87) PCT Pub. No.: WO2010/130978
PCT Pub. Date: Nov. 18, 2010

(65) Prior Publication Data
US 2012/0086382 A1   Apr. 12, 2012

(30) Foreign Application Priority Data

May 12, 2009 (GB) .................................. 0908111.8

(51) Int. Cl.
*H02P 1/04* (2006.01)
*H02P 7/00* (2006.01)

(52) U.S. Cl.
USPC .................. 318/400.19; 318/254.2; 318/438; 318/729

(58) Field of Classification Search
USPC .............. 318/400.2, 400.3, 400.29, 729, 811, 318/362, 400.19, 254.2, 438; 363/35, 41
See application file for complete search history.

(56) References Cited

U.S. PATENT DOCUMENTS

| | | | | |
|---|---|---|---|---|
| 4,575,668 A | * | 3/1986 | Baker | 318/811 |
| 4,937,509 A | * | 6/1990 | Gundlach | 318/362 |
| 4,994,950 A | * | 2/1991 | Gritter | 363/41 |
| 5,045,988 A | * | 9/1991 | Gritter et al. | 363/35 |
| 6,204,627 B1 | * | 3/2001 | Watanabe et al. | 318/729 |
| 7,202,619 B1 | * | 4/2007 | Fisher | 318/400.29 |

* cited by examiner

*Primary Examiner* — Paul Ip
(74) *Attorney, Agent, or Firm* — William H. Bollman

(57) ABSTRACT

The present invention relates to a motor controller and related method. The invention is particularly well suited for use with an alternating current (AC) induction motor. Previously motor controllers did not take into account the combined effect a control circuit and controlled motor, had upon a mains supply and more particularly their separate and combined effect upon the power factor of an alternating current. The invention solves this problem by providing a motor controller which modifies an input current to an alternating current (AC) motor. The motor controller comprises: a power input rectifier; a low voltage power supply; a variable output voltage circuit for adjusting a drive output voltage circuit; and a control circuit arranged to control the variable output voltage circuit and to provide timed waveforms to the drive output voltage circuit.

12 Claims, 16 Drawing Sheets

MOTOR CONTROLLER AND RELATED METHOD

BACKGROUND

The present invention relates to a motor controller and related method. More particularly, but not exclusively the invention relates to a motor controller, specifically, though not exclusively, for use with an alternating current (AC) induction motor.

AC motors, that typically run off a 50 Hertz (Hz) AC supply, are cheap to manufacture and reliable to operate. AC motors are found in a myriad of industrial applications, including: pumps, compressors, fans and drive systems. AC motors can be sub-divided into types according to the number of phases of the power supply. For example, AC motors may be single or three phase. Three phase AC motors tend to be more efficient than single phase motors because of the way single phase motors are usually connected to a domestic single phase power supply. It is usual for one winding to be directly connected to the supply and the other winding via a capacitor. This is known as a single phase capacitor run motor. Such motors are used extensively for power ratings between a few tens of Watts to several kilowatts. However for powers above this range, and as a result of their inherent greater efficiency and smoothness, three phase induction motors have been adopted as the workhorse of many drive systems.

In recent years there has been growing legislative pressure to improve inefficient machines, reduce unnecessary energy waste and minimise so-called 'carbon related emissions' from the perspective of their effect on environmental conditions. Pressure is in the form of lobbying, private pressure groups and also from increasingly stringent legislation and is particularly directed at electric motors.

Designers of electric motors and motor controllers have therefore been focusing on ways of improving the efficiency of motors and their controllability, with a view to operating them at optimum conditions so as to extract more power. The single phase capacitor run induction motor in particular has been singled out as not being very efficient. As a solution to this, considerable effort has resulted in the design of electrically commutated motors (ECM) or brushless DC motors. These employ a permanent magnet rotor which is marginally more efficient than a rotor whose magnetic field is derived from a circulating electrical current and the consequent resistive losses in such a rotor. However, ECMs are more expensive and the magnet is prone to degrade with time.

Another problem with ECMs is the fact that they require a controller to be incorporated into the motor housing and the controller can suffer from the effects of heat, vibration and moisture ingress.

The efficiency of the ECM is quite high but they can create problems, as their apparent high electrical efficiency belies a significant additional load to the utility and unless extra components are added (usually externally) they exhibit a poor power factor and high peak current crest value, as well as giving rise to high inrush currents on power up.

It should also be noted that the production and disposal of permanent magnets gives rise to potentially environmentally damaging pollutants that require specialised handling and treatment. This raises issues for both their manufacture and end of life recycling.

International Patent Application WO 03/084047 (Mol Belting Company) discloses a controller for a brushless motor having a power factor correction element which ensures near sinusoidal current consumption from a low frequency supply main (50 Hz or 60 Hz) and also acts as a fixed voltage regulator for delivering regulated voltage to a drive. While such additional elements are desirable, they fail to offer in-rush current protection and fail to address high voltage switching transients on the motor windings at low load levels.

One area of particular interest is AC motors that are rated at 240 volts but driven with an input voltage of around 50-180 Volts. A reason for this is that these motors are very common as they are used in so many domestic and industrial systems such as: coolers, ventilation and air conditioners and as such manufacturers are keen to see them meet the increasingly stringent environmental demands.

The aforementioned AC induction motors have however suffered from a number of drawbacks. The use of the capacitor to obtain the current-phase lead in one winding is not very efficient and also when either triac/silicon controlled rectifier (SCR) phase controllers or auto transformers are used to reduce speed and/or torque, additional losses are introduced as a result of operating at non-optimum condition, for example because of increased slip.

The losses and inefficiencies were in fact due to the imbalance that often exists between the requirements of a mechanical load, the way a motor operates and the control and conditioning of the available power. The net result is that a significant amount of energy is wasted.

Thus the present invention is principally concerned with improving the efficiency of induction motors, particularly AC induction motors, by providing a more suitable method of controlling and conditioning electrical input current and voltage, taking into account the way the induction motor works and the requirements of the mechanical load.

PRIOR ART

A drawback of EC motors has been that they require accurate sensors to control them. One technique of controlling EC motors is to employ a Hall Effect sensor which monitors and senses rotor position. This in combination with a feedback loop provides an indication of position, which in turn can be used with a phase angle controller to vary motor speed and/or torque. An example of such a device is described in U.S. Pat. No. 4,849,871 (Wallingford). However, a disadvantage with such systems was that delicate sensing equipment needs to be housed in a motor casing and this was not always possible in harsh or vibrating environments.

European Patent Application EP-A2-1 138 429 (Illinois Tool Works) discloses a controlled power supply suitable for a welding process operating at 60 Hz input power which is converted to regulated DC at a fixed controlled voltage, and is then converted to output power at an unrelated second frequency for application to the work piece. EP-A2-1 138 429 illustrates the use of high frequency drive power at a fixed voltage or optionally at a boosted voltage. The device is likely to suffer from in-rush current surge and there is no power factor correction.

Another way in which efficiency of motors has been improved is described in U.S. Pat. No. 4,520,303 (Ward). The system described includes a wound 50 Hz motor controller. However, the motor requires auxiliary motor windings which are wound in a non-standard manner and this adds to cost.

US Patent Application U.S. Pat. No. 4,879,639 (Tsukahara), describes a regenerative circuit which is complex connected to a fixed DC intermediate circuit, consisting a capacitor connected to three half-wave bridge circuits.

In yet another system, described in U.S. Pat. No. 4,651,079 (Wills), an AC rectified direct current 'half-sine' wave is generated by pulse width modulation and applied to a capacitor run AC induction motor with the capacitor still in the circuit. The system is effective but does not allow for any variation in reactance of the capacitor and is thus limited in the sense that the power factor of drive components are prone to giving rise to unpredictable current waveforms. This is in addition to very poor power factor and crest factor as well as high inrush currents which results overall in a system that requires monitoring, control and stabilisation as well as additional 'front end' current conditioning components.

All the aforementioned arrangements are active techniques of varying voltage, current and phase to an AC motor in order to improve efficiency.

In another U.S. Pat. No. 5,136,216 (Wills)—two oscillators are employed to develop a two-phase DC drive which provides a useful degree of controllability and torque. However the input waveforms are detrimental to the utility and the output waveforms are detrimental to the motor due to excessive and rapid voltage transients.

A similar arrangement is described in U.S. Pat. No. 6,713, 986 (Energy Savers) which discloses a half frequency circuit obtained using a 180° transformer and a series of triacs. However, the fact that so many triacs are employed tends to make this system less efficient and costly to maintain.

It is used for controlling electric motors typically found in air conditioning equipment and heat pumps and the device described is a speed controller. The device modifies an input current so that motor can be switched to a second speed. This is achieved by phase shifting one input waveform (applied to a first winding) by 90° with respect to a second waveform, applied to a second winding.

Modification of the waveforms, that is phase shifting one waveform with respect to another and therefore switching of the motor, is achieved with a complex circuit employing opto-isolators, triacs, thyristors, a 180° transformer and an independent low voltage power supply to power the controller. Apart from the expensive components the speed controller required a dedicated power supply, (shown in the embodiment shown in FIG. 3, as item 24) which itself not only added to purchase cost, but also introduced considerable power consumption, thereby to a large degree, defeating the object of an energy saving optimisation circuit.

Moreover, because the circuit is suitable for use with so-called split phase supplies, as are often found in the United States of America, there is a degree of redundancy of components which further add to costs.

As well as the aforementioned drawbacks of the speed controller described in U.S. Pat. No. 6,713,986, it is apparent that it was relatively inflexible. Whilst it operated at two different currents (split phase), it could not readily be modified to accommodate a range of speeds and thus provided a relatively expensive and inflexible solution.

Very few, if any, of the devices disclosed in the aforementioned Patents and Applications provide a simple device, that is cheap to manufacture, easy to install and capable of operating in a wide variety of motors.

The invention therefore arose in order to overcome the aforementioned problems and specifically those described in U.S. Pat. No. 6,713,986 (Sprout) to provide a control device, and method, that can be used to increase the 'electrical power in to mechanical power out' efficiency of an AC motor; is readily implemented as a small, robust, easy and cheap to manufacture device; which is straightforward to retrofit; and which is adaptable to a wide range of power and torque requirements.

It is another aim of the invention to provide a motor controller that does not require a separate power supply and which is adaptable to a wide range of motor types and operating conditions.

Conventional three phase induction motors of any size are used almost universally by industry for many applications where the power of a single phase motor is inadequate. It has been determined after much research that the conventional motor drive, though technically a competent device and capable of controlling motors with extreme precision, is significantly over engineered for the vast majority of tasks that a drive is actually required to do.

United States Patent Application US 2007/0114962 (Grbovic) discloses a controller for a three phase asynchronous induction motor in which a voltage step up module is provided as a device operating as a switch mode power supply to deliver a higher voltage to its output that it receives as input voltage. The switched power supply is controlled by a pulse width modulation (PWM) driver signal which acts in a well known fashion to regulate the output voltage of the switch mode power supply by adjusting the timing of a switch which grounds an input voltage through an inductor.

The very way that these conventional motor drives are designed has resulted in most drives offering solutions to many different technical and operational problems that require additional components, special parts, require specialised technical understanding and are difficult to set with the correct parameters.

International Patent Application WO-A-88/01450 (Otis Elevator Company) discloses a control system for controlling a three phase induction motor to move a lift or elevator in a regenerative manner. An AC main provides input to a fixed voltage regulated power supply which powers an inverter circuit to provide a variable frequency supply to the three phase induction motor. However, this Patent Application offers no solution to problems with mains supply power factor deviance from 1.0, nor does it address optimization of motor operating conditions.

These problems include the occurrence of a turn on surge due to charging of input capacitors. This has often led to unnecessary tripping of circuit breakers or the requirement of special circuit breakers to be fitted. The turn on surge also leads to disturbances induced in other equipment connected to a mains supply. The surge may not be supportable by the mains supply itself in areas where the mains supply impedance is high.

The problem may have been alleviated by drive manufacturers adding series resistance that is switched out after capacitors are fully charged. Alternatively a phase controlled circuit was used to effectively charge the capacitors at reduced voltage on the trailing edge of the mains waveform until fully charged.

Another problem has been poor power factor/crest of input current to drive. This was caused by the input capacitors being continually recharged at the voltage peak of the incoming waveform. The input current consequently was supplied every half cycle in a very short time, typically 100 microseconds to around 1 millisecond. The amplitude of the current spike may have been up to 10 times the average current.

There is considerable misunderstanding of this kind of current distortion. Users of these types of motor and drive combination were penalised by utility providers for drawing current from the supply in this manner. Conventional switched capacitor power factor correction systems do not effectively improve this current waveform. The situation has only been improved by a much more costly and complicated harmonic power factor correction system.

There has therefore been an effort on the part of drive manufacturers, or third party suppliers, to resolve this problem by using lumped inductors between the mains supply and the drive. Typically this was sold as an add-on unit to the drives they supplied. However, again the spiky nature of unconditioned current waveform occasionally caused problem with the circuit breakers.

Another problem was the very high rate of change of drive output voltage (dV/dT) due to the fast switching edges of transistors in half bridge drives.

Transistors and commutating diodes associated with them experience losses due to the finite time that both voltage and current are varying at the same instant during each switching transition. Commutating diodes cause significant losses due to turn off charge storage and consequential reverse recovery time current flow, in switching transistors, while at full rail voltage.

As a result motors experience problems for several reasons. The iron core, in the motor, is not suited to high frequency operation. Likewise the design of the windings is not suitable for high frequency operation. Another factor is the effective wire resistance is increased due to skin effects. Also wire insulation may degrade and fail due to the high electrical stresses induced by the high rate of change of voltage at each transition which may be in the order of 3000 Volts per microsecond. This is high when compared with typical mains frequencies of around 50 Hz which gives rise to a voltage transition of 0.15 Volts per microsecond.

Furthermore, the period of the switching cycle may cause cogging of the motor bearings. The period of the switching waveform may cause magneto-striction or acoustic effects to emanate from the motor. Consequently motor drive manufacturers required the use of special motors (at considerably higher cost) to cope with these dV/dt problems Another problem related to the high dV/dt of the drive output waveforms has been the high electromagnetic compatibility (EMC) radiation issues. These are overcome by the manufacturer, third part supplier or installer by careful earthing of the drive and the motor to minimise earth loops and by the use of special screened cable to carry the drive current between the drive and the motor. This in itself introduces another problem in that an interaction can occur between the characteristics of the drive, the characteristics and length of the cable and the characteristics of the motor.

There was therefore a risk that this interaction resulted in switching edges, causing significant voltage resonance at each switching edge. A consequence was that this high voltage led to voltage breakdown problems in the drive, cable or motor.

To some extent the problem was reduced by the manufacturer or third party fitting, at extra cost and increased losses, a filter circuit between the drive and the motor to reduce the amplitude and dV/dt of the drive voltage waveforms before they were applied to the motor.

Specifying a motor and drive combination is not a simple task. Drives as currently supplied tend to include several individual components and whose combined interaction with a mains supply and a motor is complicated and difficult to predict. Drives are therefore not typical products that should be purchased without a significant level of understanding of the underlying problems. For example drives may be complicated to program, partly because of their inherent complexity and partly because they are capable of very sophisticated functions. For most applications and certainly for the target market of the proposed drive these sophisticated functions are mostly unnecessary, often just adding to the cost of a drive.

The cost to the customer of the conventional drive is therefore misleading. End users tend to see the cost of the drive only and not the additional associated cost of power factor/crest minimization, as well as the extra costs associated with the high dV/dt of the drive output voltage waveform; and the measures required to alleviate this, such as output filters, special cabling and motors capable of handling very high dV/dt. As a consequence the fact that such drives are sold on the premise that they save energy has not been wholly accurate.

An object of the invention has therefore been to provide a motor controller suitable for use with a wide range of motors; which is able to be retro-fitted quickly and cheaply; does not require complex calibration or programming; is robust and cheap.

SUMMARY OF THE INVENTION

According to a first aspect of the invention there is provided a motor controller which modifies an input current to an alternating current (AC) motor, where said motor has at least one winding, the motor controller comprising: a power input rectifier; a low voltage power supply to supply power to a control circuit; a variable output voltage circuit for providing a variable DC voltage to the drive output voltage circuit to provide power to the at least one winding; and a control circuit arranged to control the variable output voltage circuit and to provide timed waveforms to the drive output voltage circuit.

Ideally the motor controller includes a means for modifying an input of the variable output voltage circuit, so that a near unity power factor is presented to a mains supply.

Advantageously the motor controller has a multiphase output circuit that is arranged, so that in use, a slew rate limited quasi square wave drive voltage is applied to the motor.

Preferably the multiphase output circuit is arranged, whereby in use, the wave is from the group comprising: sine wave, square wave and saw tooth wave.

Ideally the low voltage power supply derives current from the supply that powers the motor.

Preferably the power factor is corrected using the variable voltage circuit by way of continuously adjusting the current to an optimum value during the period of conduction from a mains supply.

It is appreciated that the motor may have two, three or more windings.

According to a second aspect of the invention there is provided a motor controller which modifies an input current to an alternating current (AC) motor, said motor has at least one winding, the motor controller comprising: a power input rectifier; a low voltage power supply; a variable voltage circuit for adjusting a maximum (or minimum) value of the drive output voltage; an output circuit to drive the motor and a control circuit arranged to control the variable voltage circuit and to provide time varying waveforms to the output circuit.

The slope of the waveforms applied to the motor are typically in the order of 2 Volts per microsecond and the motor controller therefore provides a very benevolent voltage and current waveform to the motor, while at the same time presenting a load to the utility of nearly unity power factor. Furthermore there is no turn on or inrush current transient.

According to another aspect, there is provided a method of controlling a motor comprising the steps of: varying an input voltage and/or current; selecting an instantaneous voltage according to the requirements of the motor and applying said instantaneous voltage to a desired winding of the motor.

In a motor controller used with a single phase motor, the predetermined and variable time duration (T) when the value of the voltage is zero, is typically between approximately 25 to 50% of the cycle of the waveform applied to the motor.

The motor controller therefore may be seen to be improving the efficiency of single phase motors by between 30% to 300%.

It is appreciated that by modifying the shape of input waveforms and by applying the voltage and current waveforms to different windings of the coil at different instants, the power efficiency of the motor is significantly enhanced.

In addition the motor controller has the capability of being produced as a solid state device, on a single, low-cost integrated circuit, which is small and robust. This is in part due to the fact that there is a single voltage 'drive' rail, from which all power (to drive the controller) is derived. In practice this feature removes the need for the isolation of different operational blocks of circuits, because circuit blocks are adapted to draw less current thereby reducing the power consumption of the controller.

In a particularly preferred embodiment, the motor controller is also capable of introducing a predetermined phase lead/lag, between a first ($I_1$) current and first voltage ($V_1$), to a first winding of the motor and a predetermined phase lead/lag to a second ($I_2$) current and a second ($V_2$) voltage to a second winding of the motor, so as to improve further the power efficiency.

It is understood that the term efficiency is the ratio of the total energy that is supplied from the mains itself that is paid for by the customer to the amount of work done by the motor. This allows for all losses in the motor, the drive, wiring and the power factor correction equipment and consequently proper comparisons between technical solutions offered by different motor drive systems.

According to another aspect of the invention there is provided a method of controlling a motor comprising the steps of: modifying an input current to an alternating current (AC) motor, the motor having first and second windings, the motor in use, the steps comprising: deriving a low voltage power supply; rectifying said supply; providing a reduced DC voltage while presenting an acceptable power factor to the supply, providing control and timing signals and providing a multiphase output stage so as to provide the modified drive voltage and current whose value is zero for a predetermined time duration (T).

The motor controller is adapted to be connected, in series, to an input power supply, thereby permitting retro-fitting and straightforward adjustment once connected.

A microprocessor may be employed to optimise performance by monitoring speed and/or torque of the motor and by way of a feedback mechanism the performance may be further enhanced.

Similarly a resistive load may be placed in series with the motor and by monitoring current fluctuations through the resistive load, harmonic information may be obtained which can be used to calculate the time duration (T) during when the value of the modified drive current is zero and to determine the shape of the waveform to be applied in order to maintain the power factor at an optimum, thereby running the motor as efficiently as possible. This in turn provides a user with a very accurate and reliable speed control of the motor, over its complete range, 0 revolutions per minute (RPM) to maximum rotational speed.

The motor controller is capable of operating with one, two, three or more phase power supplies and is therefore more versatile than many existing types of motor controller. Configuration from single to three phase motor operation can be achieved by simple modification of the multiphase output circuit and retiming of the control circuit.

Ideally the motor controller also includes a logic controller that is in the form of a solid-state device, such as a microprocessor. The microprocessor is ideally implemented in the form of a complementary metal oxide on semiconductor (CMOS) device, which means it is cheap to produce, robust in operation and reliable.

Preferably the motor controller shapes an input waveform so as to modify for example, by way of a device that performs a function known as peak flattening. This technique effectively broadens the sinusoidal peak and flattens the overall wave, with the result that energy is applied in a more continuous manner over a given time interval.

Ideally means for varying the phase angle (Ø) enables current and/or voltage to be selected for each winding in such a way that an ideal phase lead/lag is selected so as to enable the motor to operate in optimum conditions. In the event of temperature variations or other effects that cause thermal 'drift', it is therefore possible to use the phase angle (Ø) varying means in such as a way as to trim the phase angle easily and simply.

Alternatively, or in addition to the aforementioned device, a technique of harmonic analysis may be applied to the input current. This technique monitors phase angle (Ø), peak amplitude (A), speed and torque so that power (Watts) expressed as: volts×Amps/speed ($IV/\omega$) can be varied in an optimum manner.

Certain electric equipment—such as pumps and compressors—require significant electric current in order to achieve inductive effects and in order to generate higher magnetic fields for starting. However, this equipment tends to suffer from high heat losses due to current heating effects ($I^2R$). The invention overcomes this by reducing the peak input current applied due to the lower drive rail voltage and reducing inductive effects by reducing the generation of back electromotive forces (EMFs).

In a particularly preferred embodiment of the invention, components are surface mounted on a circuit board that is ideally potted and compact, thereby occupying as minimum volume as possible and being ideally adapted to be retro-fitted into an existing circuit.

Typically the dimensions of a packaged device for a small single phase motor are less than 4 cm long, 3 cm wide and 2 cm thick. This provides a volume of $2.4 \times 10^{-6}$ m$^3$ into which components may be potted or otherwise housed.

In an alternative embodiment of a motor controller, means may be provided to vary the frequency (duty cycle) of a rectified wave, in addition to the phase (Ø) and peak amplitude (A).

Ideally an input voltage is obtained from a mains AC voltage (230/240 Volts). It could also be mains AC voltage of different values or a direct current (DC) supply.

Remote monitoring of input variables such as (frequency, phase and peak amplitude) as well as output variables (speed and torque) may be achieved by way of telemetric techniques such as a supervisory control and data acquisition system (SCADA).

Equipment, in which the aforementioned motor controllers may be incorporated include: industrial and domestic plant, such as: pumps, vacuum and drive systems. Household devices include: refrigerators, air conditioners and air conditioning units, fans, washing machines, spin driers, tumble driers, food mixers and processors, grinders, shoe polishers, ventilation fans.

Other drive equipment which includes electric motors are automotive motor drives or power-train equipment for example for vehicles. Therefore by use of the controller for such larger drive systems, further energy savings can be made as well as improvements in performance and controllability of such vehicles.

A phase converter may be accomplished with the motor controller so as to, for example, permit single phase to be converted to three phase (and vice versa).

Reversing of the motor may be accomplished by altering the phase timing of the waveforms applied to the motor.

Operating the motor in a regenerative mode is possible. However the returned energy from the motor, if of a significantly large amount, will require removing from the drive in the usual manner adopted by conventional drives.

The circuitry of the drive, as described below, may also be either incorporated within the frame of the motor or attached to the outside of the motor body to form a complete motor/drive assembly.

Preferred embodiments of the invention will now be described, by way of example only, and with reference to the Figures, in which:

DETAILED DESCRIPTION OF PREFERRED EMBODIMENTS

Figure 1:
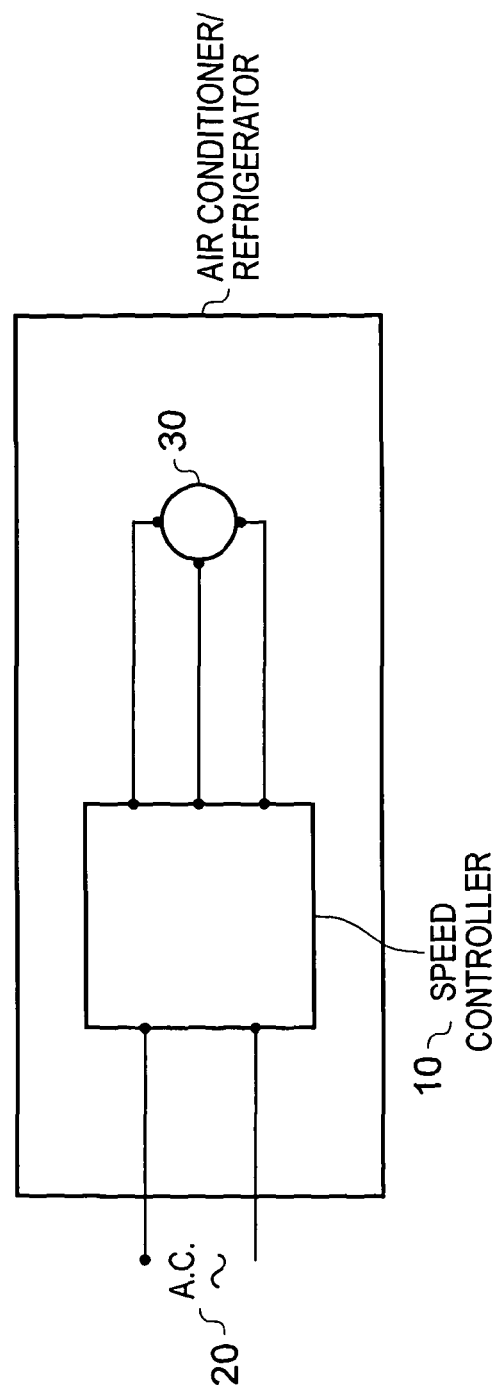
FIG. 1 is a block diagram, showing a motor speed controller connected to an air conditioning system.

Referring to FIG. 1 there is shown a motor speed controller 10 connected to a mains power supply 20 and to an electric motor 30, which is located either separate from, or housed inside, an appliance, for example an air conditioner or refrigerator. As an alternative to an air conditioner it is understood that the motor speed controller 10 may be connected to a motor in a refrigerator, pump, production machine, blower or any other appliance or device in which a motor is incorporated.

In use the speed controller 10 allows a power factor of around 0.9-0.95 to be achieved while operating the motor at the desired speed.

Figure 2:
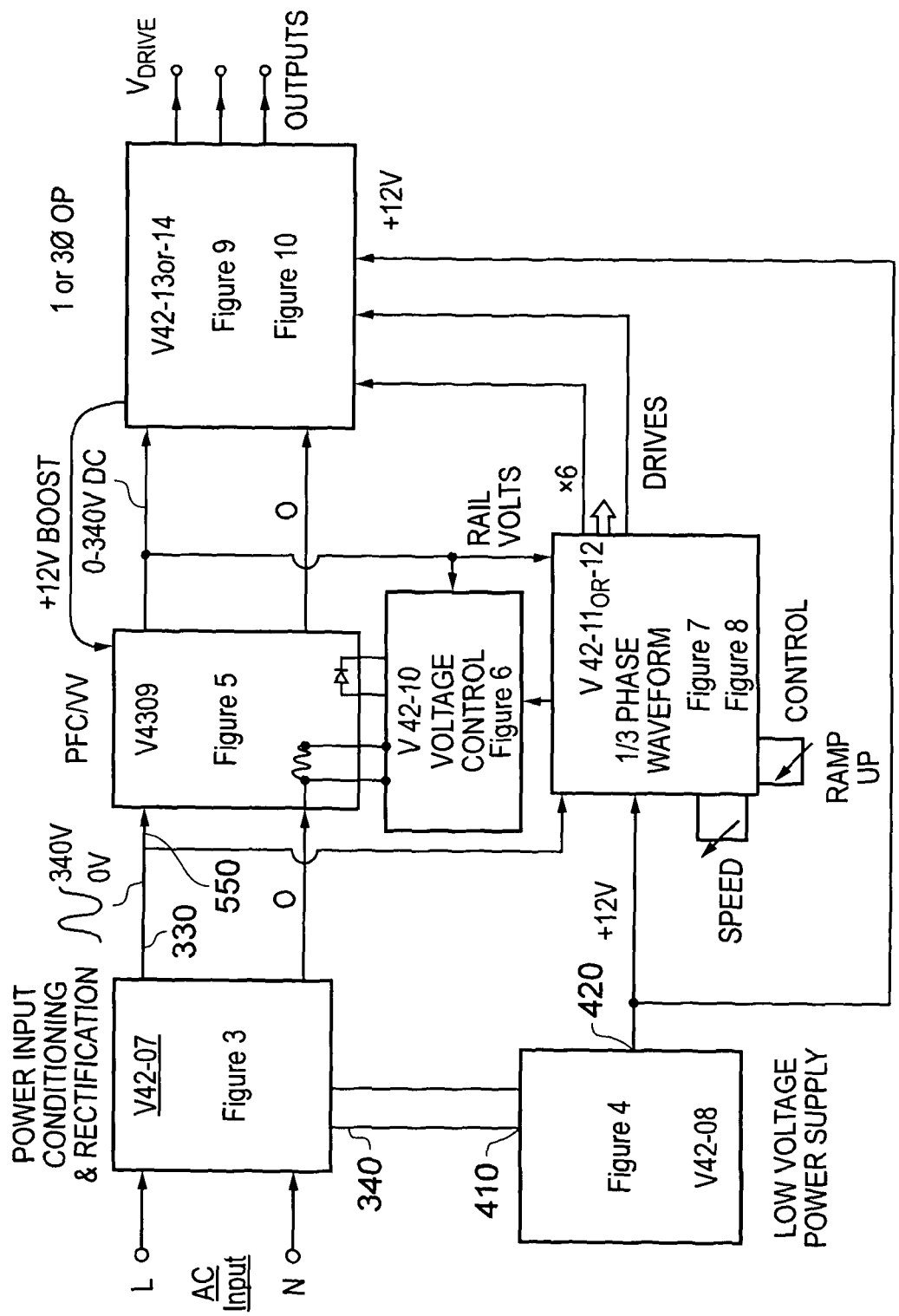
FIG. 2 is a block diagram showing key functional components of one example of the motor speed controller; each functional component is shown in detail in FIGS. 3 to 10.

FIG. 2 shows a block diagram of an example of one embodiment of the speed controller 10, in which the interrelation of key functional stages is depicted. The principle of each functional stage is described briefly below with reference to FIG. 2. Reference should be made to respective FIGS. 3 to 10, in order to understand the detailed operation of each functional stage.

Figure 3:
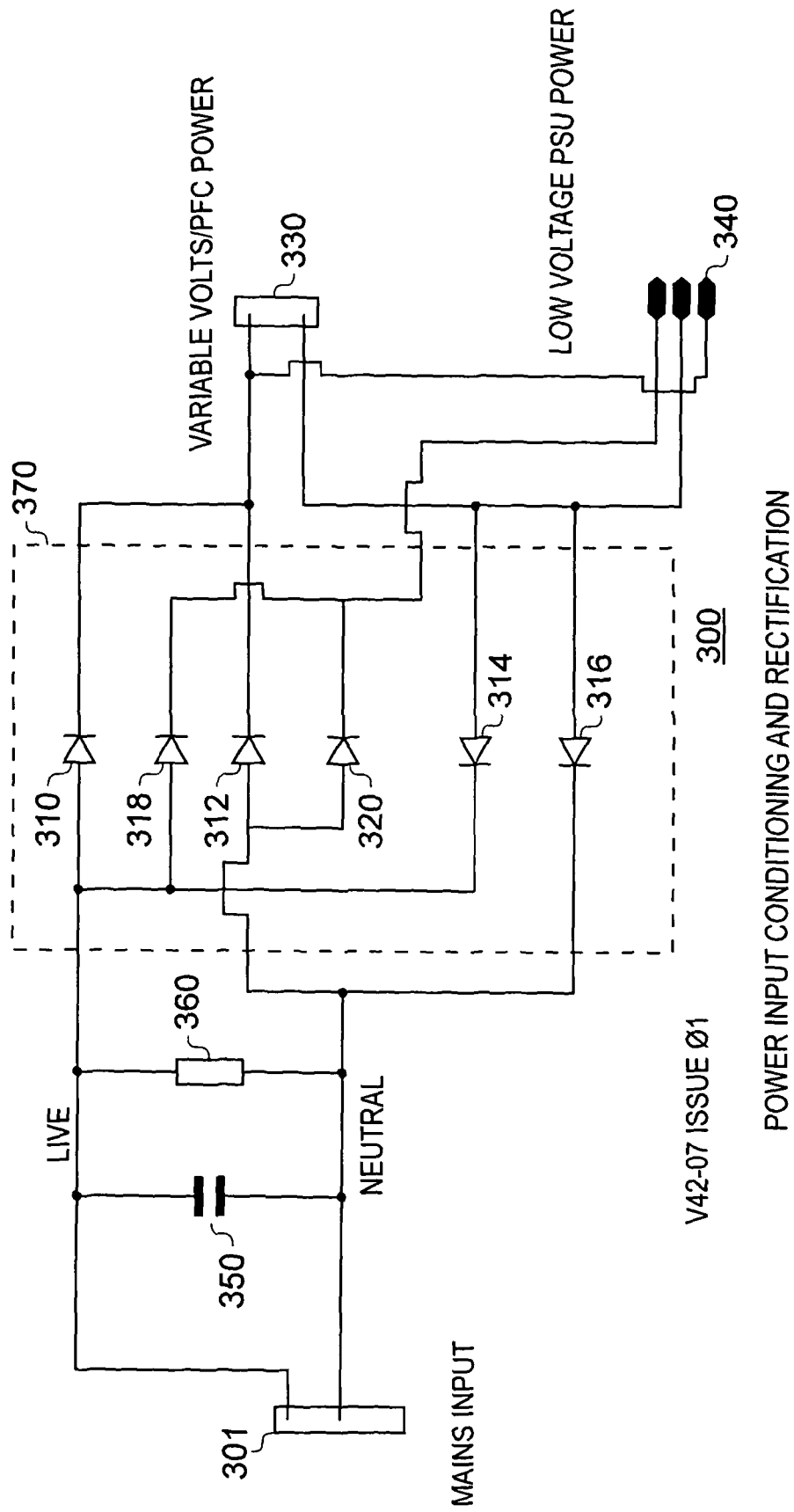
FIG. 3 is a circuit diagram of a power input rectifier.
Figure 4:
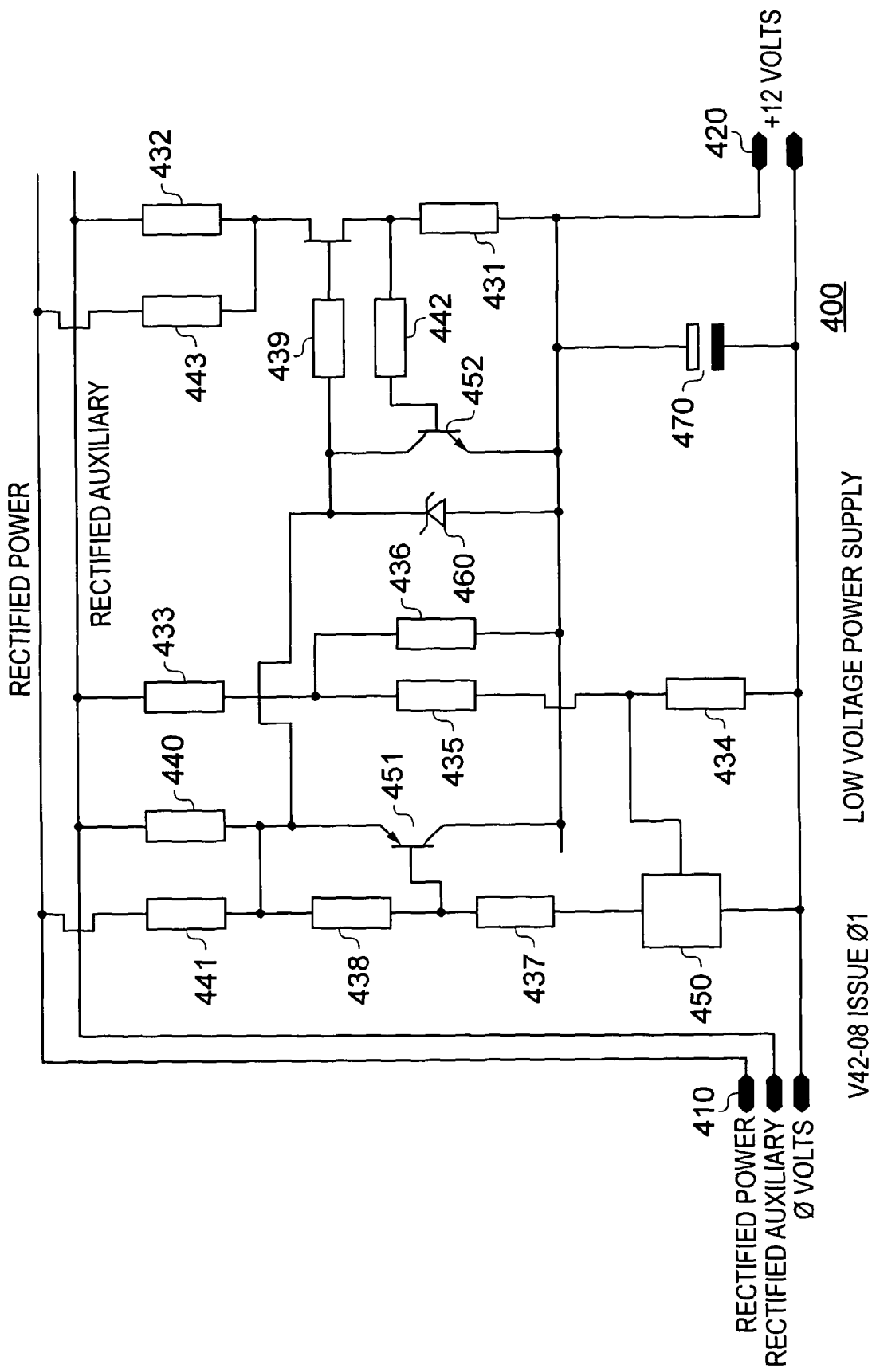
FIG. 4 is a circuit diagram of a low voltage power supply.
Figure 5:
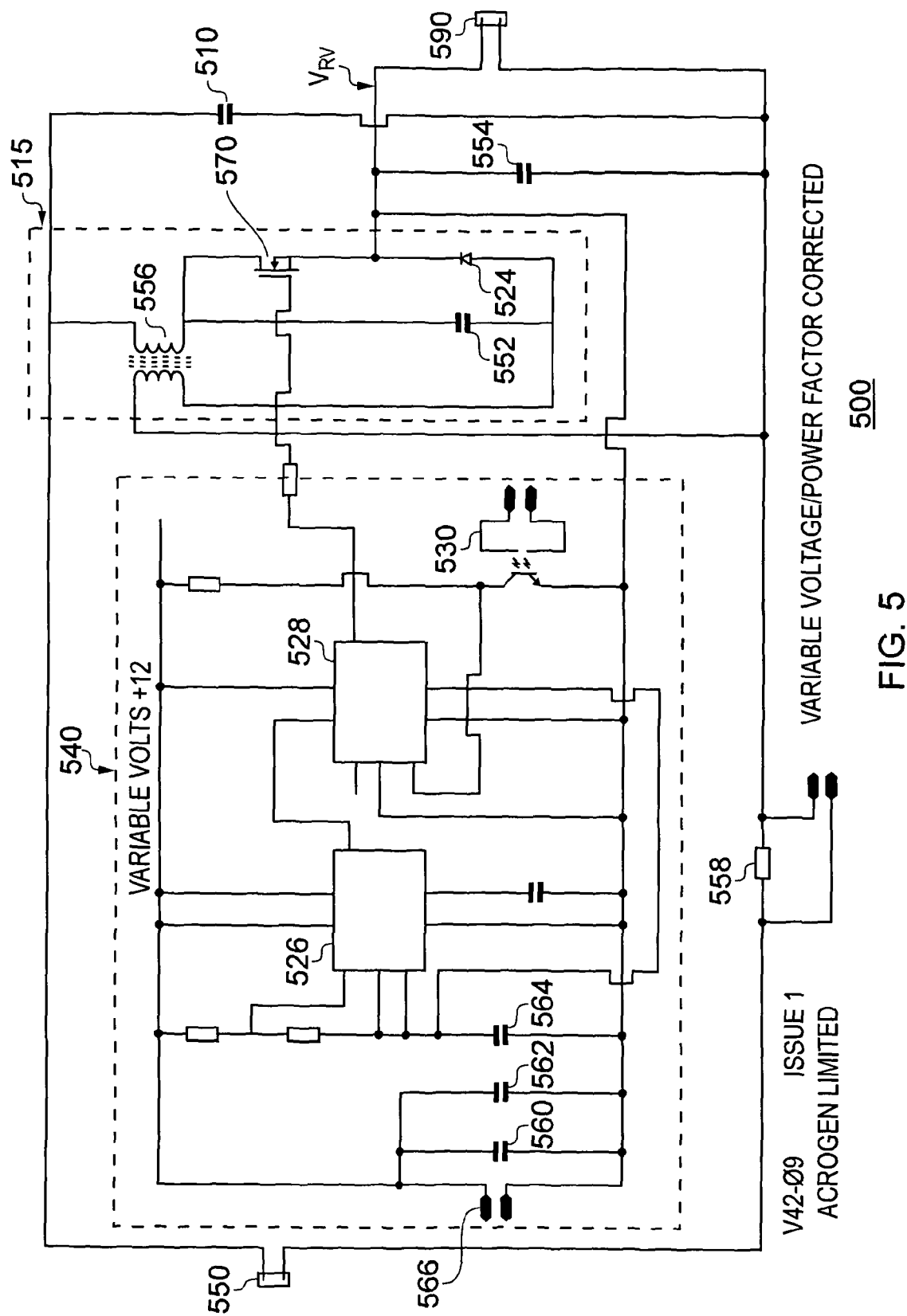
FIG. 5 is a circuit diagram of a variable output voltage power factor corrector (VV/PFC)
Figure 6:
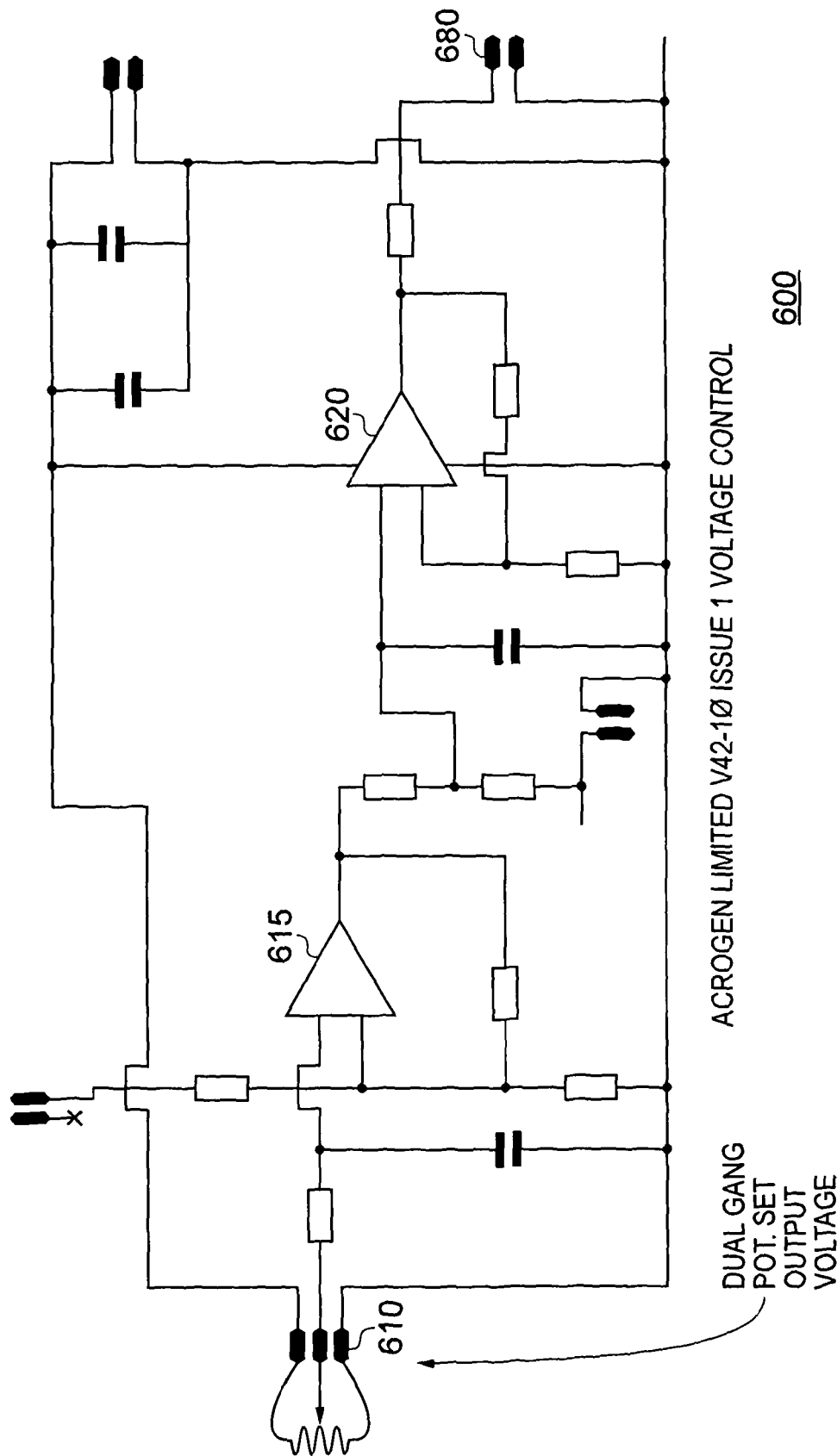
FIG. 6 is a circuit diagram of voltage controller.
Figure 8:
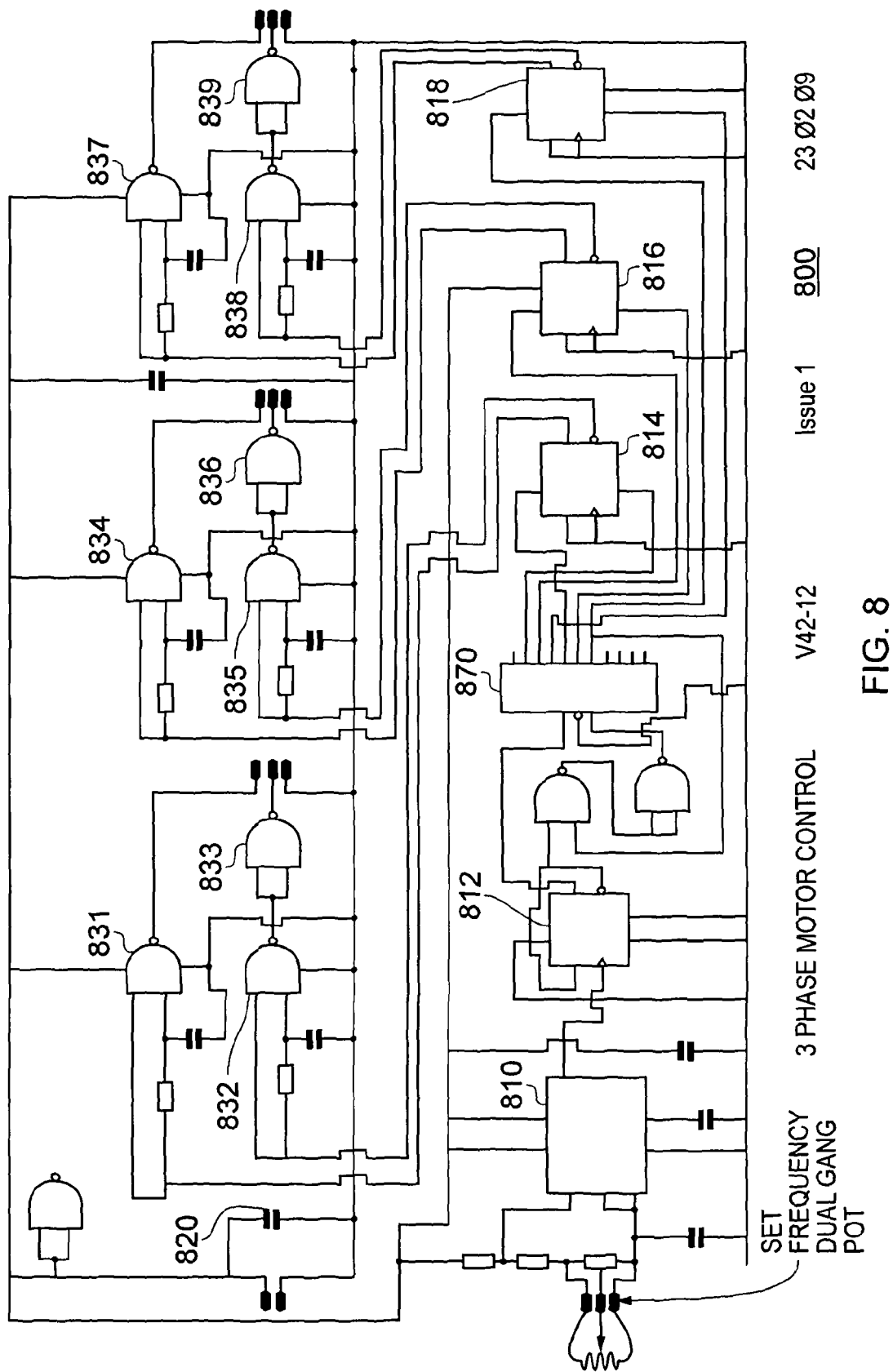
FIG. 8 is a circuit diagram of motor controller logic, suitable for a three phase motor.
Figure 9:
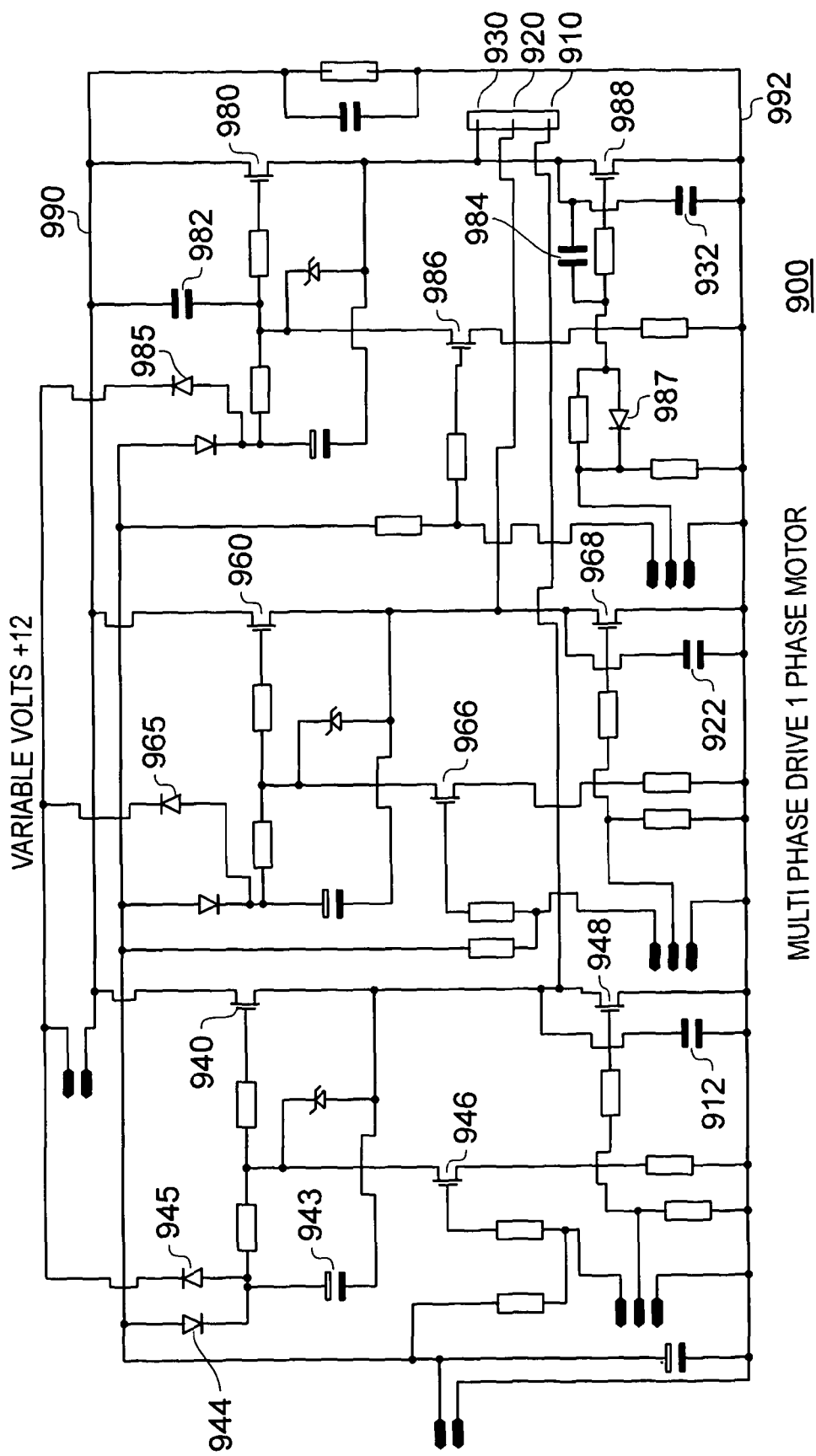
FIG. 9 is a circuit diagram of a multi phase drive circuit, suitable for a single phase motor.
Figure 10:
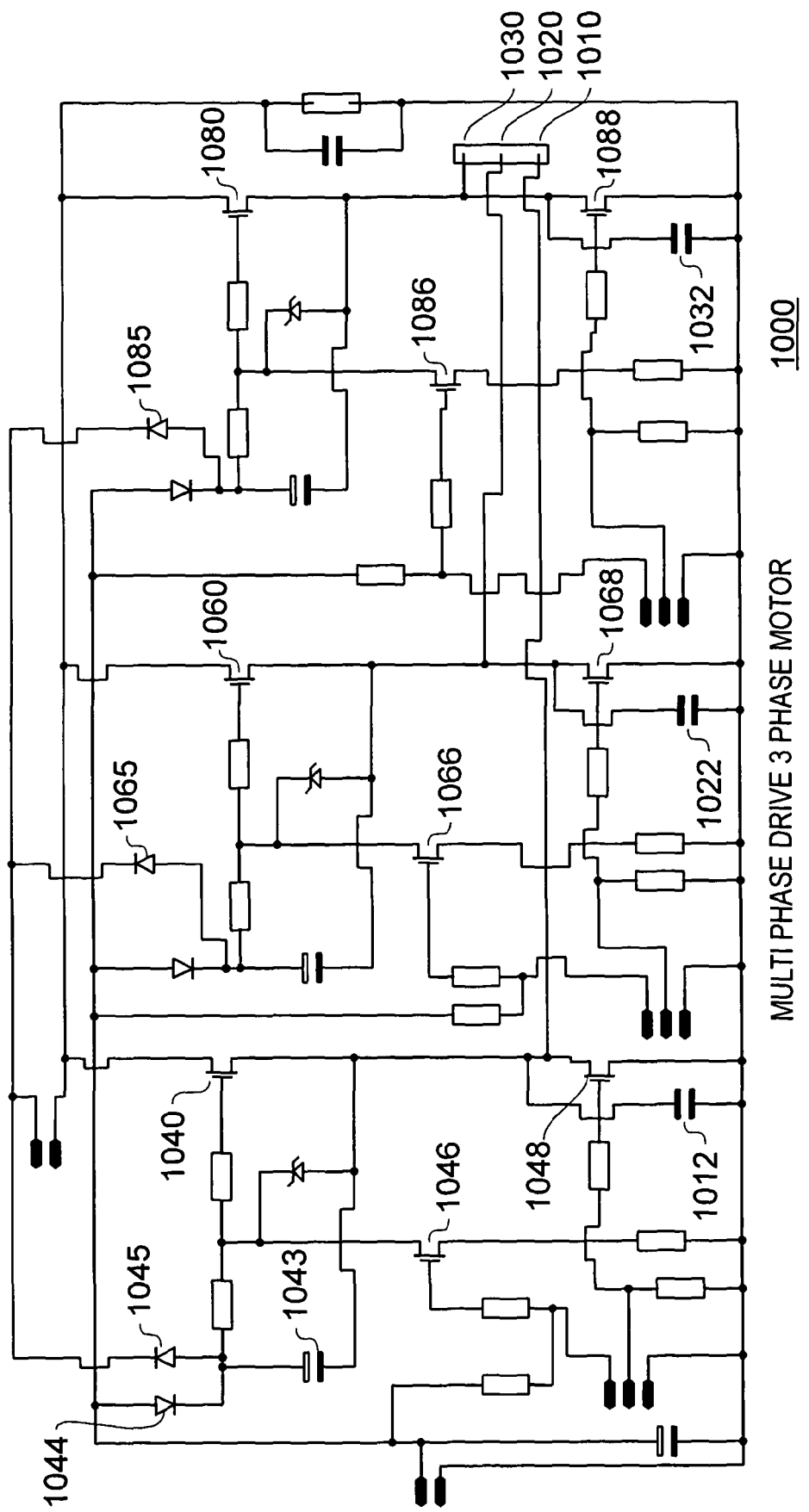
FIG. 10 is a circuit diagram of a multi phase drive circuit, suitable for a three phase motor.

The speed controller 10 includes the following modules: a rectified power supply shown in detail in FIG. 3; a low voltage power supply, shown in detail in FIG. 4; a variable voltage/power factor correction stage, shown in detail in FIG. 5; a voltage controller, shown in detail in FIG. 6; a phase controller (a single phase controller is shown in greater detail in FIG. 7 and a three-phase controller is shown in greater detail in FIG. 8); and a multiphase drive stage (a single phase drive is shown in greater detail in FIG. 9 and a three-phase drive is shown in greater detail in FIG. 10).

Referring generally to FIG. 2, there is shown an example of a circuit that the alternating current input is rectified by the rectification circuit in FIG. 3 so as to provide a full wave rectified supply current. The full wave rectified supply voltage is reduced under control of a series switch 570 in FIG. 5, which at the same time conditions the current (I 551) that is input into the drive, so that the power factor of the input current (I 551) very closely approximates to unity.

The rectified mains input voltage input (V 553) when series switch 570 is thrown (FIG. 5) in conjunction with circuitry 515 provides an adjustable rail voltage ($V_{RV}$), which is supplied to a multiphase drive, as shown for example in FIG. 9 or FIG. 10 and from the multiphase drive 900 or 1000 to motor 30. The value of drive voltage ($V_{DRIVE}$) is zero for a predetermined and variable time duration. The advantage of having mains power stored in capacitor 554 at the voltage required by the drive is that high frequency chopping of the mains power down to the voltage level required by the motor is done in the controlled environment of the drive itself with the magnetic components 556 specifically designed for this.

Multiphase drive 900 or 1000 switches at the desired motor frequency and over the lowest possible voltage range thus leading to extremely low switching losses. The multiphase drive provides a modified drive voltage with a maximum peak amplitude of $V_{RV}$ and by this means a suitable voltage and current waveform with minimal current transients and voltage transients with a relatively small rate of fluctuation as set by the value of the slew rate capacitors 912, 922, 932, 982, 984, 1012, 1022, 1032 is supplied to the motor 30 whilst the drive 10 is simultaneously presenting a load to the supply of nearly unity power factor.

Another advantage of the use of the variable voltage power factor controlled circuit, in conjunction with the multiphase drive, is that it allows the voltage transients that can be present on the mains due to external disturbances to be isolated from the multiphase output switching devices 940, 948, 960, 968, 980, 988, 1040, 1048, 1060, 1068, 1080,1088. This is achieved because the transistor 570 is effectively in series with these switching devices and the mains.

The voltage of capacitor 554 is only a maximum of say 300 volts for a single phase drive thus allowing the maximum voltage of the multiphase output switching devices to be rated at a minimum of 350 volts. A conventional motor drive requires these devices to be of 600 volt rating or higher as they are effectively connected directly across the mains. The lower voltage requirement of the switching devices in the multiphase output of 10 along with the fact that they only experience voltages near their rating, at full speed and full voltage, when $V_{RV}$ approaches 300 volts. This means that the voltage stress on these devices is minimised.

Also the low maximum voltage or breakdown voltage requirement, means that the devices have lower forward voltage drops than equivalent higher voltage rated parts in a conventional drive, leading to the motor controller 10 having higher efficiencies and lower cost components for a similar power specification.

Switching device 570 is the only device that is connected across the mains directly and even this device is not so much at risk because of the impedance of coils 556 and the fact that capacitor 554 may be charged to some level therefore minimising the voltage stress across device 570.

This series connection of the variable voltage power factor circuit and the multiphase output circuit means that the use of varistors (that could be included in circuit 300 in parallel with capacitor 350) to absorb mains transients would be more effective as the clamping voltage of say 700 volts (of a 250 AC volts working part) would be shared between the two circuits.

A low voltage power supply, shown in FIG. 4, provides power to operate the components in the speed controller 10. The circuit shown in FIG. 6 both regulates output voltage ($V_{RV}$) and optimises the power factor from variable voltage power factor corrected circuit, shown in FIG. 5.

Figure 7:
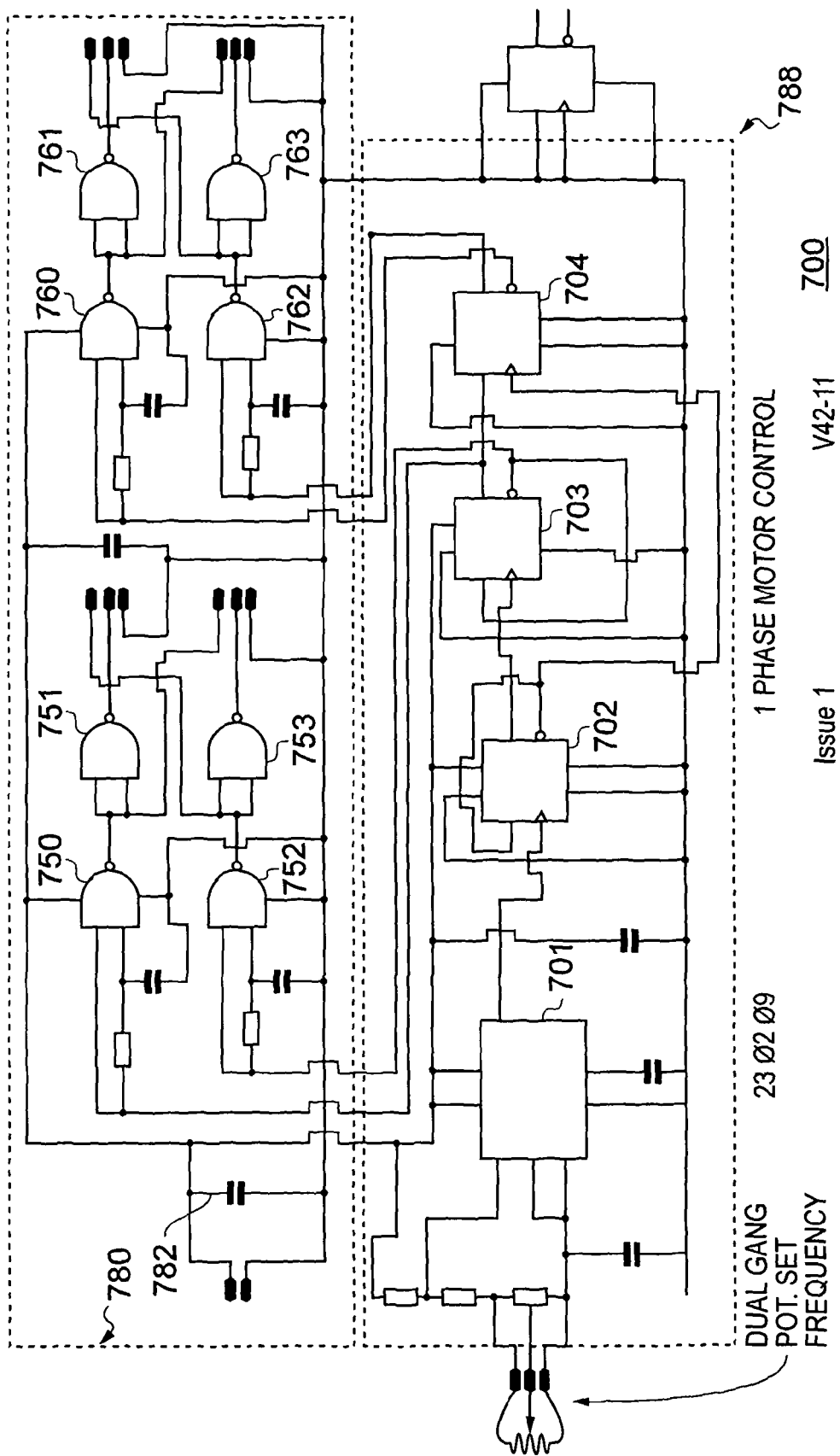
FIG. 7 is a circuit diagram of motor controller logic, suitable for a single phase motor.

Timing and logic circuitry, shown in FIGS. 7 and 8, derive waveform timing from 701 or 810. The waveform timing is required by the multiphase drives (shown in FIGS. 9 and 10) to operate the motor 30 at an ideal speed, with the optimum combination of voltage and frequency, thereby achieving an efficiency in transforming electrical energy into mechanical energy.

FIG. 3 is a circuit diagram of a power input rectifier. It shows a rectified power supply 300 which modifies an input current using a DC rectifier 370 and supplies a full wave rectified power supply to variable voltage power factor corrector circuit 500, as shown in FIG. 5. Rectified power supply circuit 300 simultaneously provides a low power input to a low voltage power supply circuit 400, shown in FIG. 4. A smoothing capacitor 350, typically of around 100 nano Farads (nF) and a resistor 360 are arranged across live input terminals 301 and 302 to smooth mains input voltage. In practice the input terminals 301 and 302 may be a mains supply cable, plug or a junction box.

The rectified power supply circuit 300 as shown is suitable for a single phase supply. Circuit 300 comprises a bank of four diodes 310, 312, 314 and 316, arranged in a bridge configuration and acting as half wave rectifiers, to provide a full wave rectified supply at output 330. Diodes 318 and 320 act in conjunction with shared rectifiers 314 and 316 to provide a waveform that reduces to zero every half cycle and, in so doing, isolates any residual charge from the variable voltage power factor corrected circuit 500 that may be present at 330. This feature therefore optimises the efficiency of the low voltage power supply 400 across a broad voltage range. An advantage of this is that, in some situations, particularly where mains power supplies are unreliable or fluctuate, the controller circuit 10 is able to derive sufficient current, typically only 5-10 milliamps, so that is may function even if the mains supply is as low as 40 Volts.

There are two outputs of the rectified power supply circuit 300. The bank of four diodes 310, 312, 314 and 316 and diodes 318 and 320 therefore provide, in parallel a full wave rectified supply at output 330 which supplies current to the variable voltage/power factor correction circuit 500 (shown in detail in FIG. 5) and an auxiliary rectified power supply 340, for the purpose of supplying current to a low voltage power supply 400, shown in FIG. 4 and described in detail below.

FIG. 4 is a circuit diagram of a low voltage power supply. A low voltage power supply 400 receives a rectified current at a variable voltage, depending upon the integrity and reliability of the local mains supply. This voltage may range typically from 30 to 240 volts. The low voltage power supply 400 ensures that a constant 12 volt output voltage is provided at its output terminal 420, shown in detail in FIG. 4.

In use the low voltage power supply circuit 400 supplies power to various components of the motor controller 10 so that they can perform their task. This is done by a direct connection to components described with reference to the aforementioned circuits shown in FIGS. 6, 7 and 8. Power is also supplied from the low voltage power supply 400, through to so-called floating switches 940, 960, 980, 1040, 1060 and 1080 via what is often referred to as a 'bootstrap' drive on multiphase output stage 900, 1000, shown in FIGS. 9 and 10. Current also flows from the multiphase output stage floating switches via another path 945, 965, 985, 1045, 1065 and 1085 to supply power variable volts +12 to the variable voltage/power factor correction circuit (shown in FIG. 5).

Circuit 400 operates as a non isolated active linear supply that derives its power directly from a full wave rectified mains. Linear operation may be considered to be somewhat wasteful of power—due to the loss of power in the voltage dropping component 454—but the circuitry of the drive 10 is so designed so that its overall consumption of current, from the low voltage supply, is in the order of 5 to 10 mA at approximately 12 Volts. This very small power requirement could be satisfied with a more expensive switch mode arrangement, but switching losses of this kind of circuit for this low power output are almost of the same order of magnitude as a linear approach adopted in circuit 400.

Figure 12:
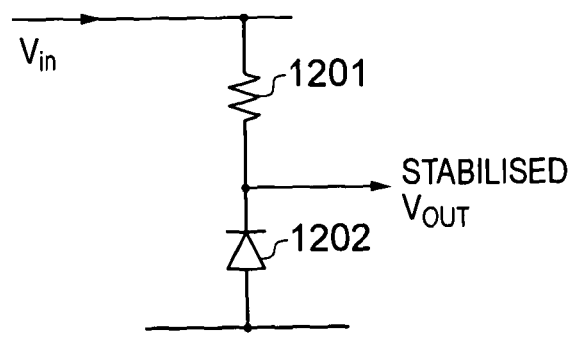
FIG. 12 is a circuit diagram of a simple Zener voltage stabilizer.

The simplest arrangement of linear supply (FIG. 12) is to use a dropper resistor 1201 and a Zener diode 1202. This arrangement suffers from two major deficiencies of excessive wasted power in the dropper resistor and a limited input voltage operating range. This is because the dropper resistor value has to be chosen so that the current output at the lowest supply voltage (at which the drive is designed to operate) exceeds the highest current draw of the drive circuitry, with only two or three milliamps to spare, thereby ensuring the Zener diode is in its active stable region. Consequently at the normal operating voltage, the current across the dropper resistor increases and this extra current is wasted as power in the dropper resistor and the Zener diode.

These problems, typically associated with the type of linear power supplies used in prior art systems, to a large extent are overcome by the operation of the circuit 400. Transistor 454 is operated in its linear mode and is effectively a variable resistor in place of the dropper resistor 1201 described above. The maximum current that can flow in transistor 454 is set by a clamp circuit consisting of transistor 452 and resistor 431. If the voltage across resistor 431 exceeds the $V_{BE}$ of transistor 452 then the gate voltage of transistor 454 is reduced, thus limiting the drain current of transistor 454. Resistors 440 and 441 provide sufficient voltage to turn transistor 454 on and Zener diode 460 provides protection of the gate terminal of transistor 454 from excessive voltages.

Current ($I_{PSU}$) through series transistor 454 charges up a low voltage supply storage and smoothing capacitor 470. The voltage across capacitor 470 is monitored by a programmable precision reference 450 and in conjunction with the potential divider resistors 434, 435 and 436, set the capacitor 470 voltage to nominally 12 volts. If the voltage across resistor 434 is below the threshold of reference 450, the reference 450 only draws a very small (typically 50 µA) current through resistor 437 and transistor 451 is off and therefore Current ($I_{PSU}$) flows through transistor 454 charging capacitor 470. When the capacitor 470 voltage is 12 volts the voltage across resistor 434 is equal or greater than the programmable precision reference 450 reference voltage of 1.24 volts and then the current through the resistor 437 sharply ramps up to 10s' of milliamps. This sharp increase in current of the programmable precision reference 450 limits or cuts off completely the Current ($I_{PSU}$). It does this by drawing current through the network of resistors 437 and 438, in conjunction with the impedance converting transistor 451, which effectively reduces the gate drive to transistor 454, thus limiting the current inflow ($I_{PSU}$) to capacitor 452 and stabilising the voltage at 12 volts.

The action of circuit 400 is to ensure that only sufficient current is supplied from the mains to deliver a nominal 12 volt supply at exactly the current required by the circuitry connected to output terminal 420. The voltage of the mains supply is not important as the impedance of transistor 454 adjusts itself automatically to be exactly the right resistance to pass the desired level of current. Therefore it is appreciated that the arrangement described, overcomes the two main problems detailed above of the basic (FIG. 12) resistor voltage dropper/Zener diode type supply.

Circuit 400 also includes a feature that significantly improves the efficiency of a series dropper type power supply. Because the mains voltage is typically much higher than 12 volts for most of each half cycle, it is ideally desirable to try and concentrate the charging of capacitor 470 at the beginning of a half cycle and at the end of each half cycle (when the voltage drop across transistor 454) is as low as possible.

The circuit 400 therefore needs to act to ensure energy is only derived from leading and trailing edges of rising or falling voltage waves and it achieves this by way of potential divider resistors 434, 435 and 436 and this potential is modulated (via resistor 433) by the actual mains voltage at all points of the half cycle. The effect of this is to cause precision reference integrated circuit 450 to sense that the voltage on capacitor 470 has achieved or exceeded the correct voltage (nominally 12 volts) during the middle and consequently high voltage part of each half cycle; and to be below the desired voltage (nominally 12 volts on capacitor 470) on the rising and falling part of the mains waveform cycle where the voltage drop across the transistor 454 is relatively low. This effect of charging capacitor 470 only at the very beginning and end of the mains half cycle becomes more pronounced the higher the mains voltage is which in turn acts to improve the efficiency of this mechanism.

The combination of low voltage power supply techniques, together with the very low power consumption design of the overall drive motor controller 10 ensures a very small current is drawn from the mains supply and thus a very small amount of power (typically 0.5 to 1 Watt) is drawn from the mains supply by the low voltage power supply circuit.

This power drawn reduces to almost zero watts when the controller 10 is in standby mode and is proportionate to the output power when drive 10 is operating. This is in contrast to previous systems which required a few to several tens of Watts in order to drive ancillary devices within the drive. Therefore not only were these prior art devices heavy power consumption devices but were also more bulky and therefore could not be so easily retro-fitted or potentially put onto silicon.

If isolated power is also required then an alternative way to charge capacitor 470 is to use a switch mode power supply (not shown) or an independent power supply unit or PSU (not shown). Both these alternatives have an extra winding for an isolated power provision. Yet another way is that the isolated power supply provision may be achieved using the power supply as already described with reference to FIG. 4, if, for example, a separate oscillator and isolating transformer are used and the isolated supply burden was only one or two milliamps on supply 400.

The overall effect of the circuit shown in FIG. 4 is to ensure that the current tapped off the mains supply is exactly matched to the current drawn from supply 400, thereby ensuring that only the absolute minimum essential energy is extracted from the supply and also that as the power is drawn from the leading and trailing edges only of the mains input, the circuit is extremely efficient for a linear dropper design and any inherent losses (and therefore heating effects) are kept to an absolute minimum.

Another novel feature of this power supply circuit is the way that its power consumption point in the mains waveform dovetails with the power consumption points of the drive itself. This stage 400 of the controller 10 tends to draw power from leading and trailing edges of a waveform, and the variable voltage/power factor correction circuit (shown in FIG. 5) tends to draw power from the central portion of a wave, thus the overall power factor characteristics of the controller 10 are balanced and improved.

FIG. 5 is a circuit diagram of a variable output voltage/power factor corrector (VV/PFC). It acts as a very efficient power factor corrector, typically achieving a power factor in excess of 0.9 using readily available and reliable components.

It does not suffer from turn on/power up current surges due to a series pass transistor 570 and transformer 556, which together, with capacitor 522 and diode 524, act as a dynamic reservoir 515 capable of receiving and storing excess energy and releasing it upon demand to a bulk storage capacitor 554.

It will be appreciated therefore that the topology of the dynamic reservoir 515 and its position in series, between a mains supply, and the bulk storage capacitor 554 helps dampen any spike or current surges which may occur at switch on, or during periods of transient reduced mains voltage (brown out) conditions. Also the concept of powering up difficult loads, for example as occurs in motors on refrigerators when they are repeatedly actuated by a thermocouple switch (not shown), is also aided by being able to provide low voltage and low frequency power supply to the motor 30 to develop high torque for starting, while at the same time only providing a low surge to the mains.

A unique feature of this variable voltage power factor corrected concept is the opportunity to make a motor and drive combination that exhibits some unusual traits.

The use of a motor with reduced voltage windings will give improved power factor. When the motor is specified, rewound or if the motor has alternative windings it may be chosen so that the motor winding full power voltage can be reduced while still maintaining the given shaft power output. Consequently a given shaft power output from the motor is therefore achieved at a lower $V_{RV}$ (and winding current). The lower $V_{RV}$ means that the percentage of each mains half cycle that is available for current to be drawn from the mains is increased thus improving power factor.

In areas of the world where the available power is of reduced voltage and/or high impedance the proposed motor controller will perform several functions. If the motor is to be run under continuous low voltage conditions, the power factor circuit can be designed to optimize the current drawn so as to extract the maximum power with the minimum power line losses. It would do this in conjunction with a reduction in output frequency to the motor to maintain useful torque at reduced speed, thus allowing the process the motor operates to continue, albeit at reduced speed. The low voltage power supply 400 is fully operational at a line voltage of 40 volts and the whole motor controller 10 is fully functional at this level and is capable of providing significant torque at about 20% of full speed.

A major problem in low voltage/high impedance situations is that it is not possible to start induction motors due to the high starting current required (very low rotor speed causes high input current) and the lack of torque when starting (high levels of slip). This motor controller 10, and its unique configuration, is particularly suited to overcome this problem. The voltage $V_{RV}$ can be set at any voltage from zero upwards and under these conditions the drive frequency can be extremely low thus developing extremely high motor torques for starting, while the impedance conversion effect of the variable voltage power factor corrected circuitry 500 presents a low load with excellent power factor to the mains. The relatively slow rise and fall times dV/dt of the drive waveforms from 900 and 1000 allow operation with motors with normal levels of insulation typical of old motors.

Conventional drive inrush current is also a problem for reduced voltage and/or high impedance operation. The inrush current at turn on of a conventional drive can cause significant problems with other equipment connected to the mains or the fuses and circuit breakers may trip. The necessity of fitting oversized sizes of fuses and breakers or wiring round these devices in order to get a conventional motor drive to work obviously creates a safety hazard. The variable voltage power factor corrected circuit 500 does not have this surge characteristic thus eliminating this problem.

There is quite often significant difficulty with single and three phase motor operation in areas with reduced voltage and/or high impedance line operation. There is a very great need for 3 phase motors to be operated in areas where these kinds of conditions prevail. The conventional solution is to use a one to three phase converter that incorporates a continuously running three phase motor with a phase inverting transformer and phase shifting capacitors. The other three phase motors are started and run using the one to three phase converter as a kind of spinning reservoir to get them started.

Normal conventional three phase drives are of very limited use for these kinds of applications due to inrush current, current crest factor and power factor issues, low voltage dip tolerance, radio frequency interference (RFI) issues and the high frequency switching output at the full mains voltage at all load and speed settings, which quickly damage the winding insulation and is incompatible with the quality of the motor steels used. The alternative is to use single phase motors for these applications but the lack of starting torque and lower efficiency than three phase motors makes this also an unacceptable solution.

The motor controller 10 eliminates these problems. Each 1 or 3 phase motor can be fitted with a motor controller 10. The cost of this will be significantly less than a one to three phase converter approach and considerably more efficient as a whole. Several motors can also be run off one controller if they all run at the same speed and load at the same time.

Improved operation can be achieved under difficult conditions with extra energy storage. The capacitor 554 may be increased in capacitance to improve the 'ride through' capability of the drive, but the voltage on the preferred capacitor is directly related to the speed of the motor, so if the motor speed is required to be changed fairly quickly this will limit the maximum value of the capacitor that can be used. Alternatively the drive can be run off a DC (direct current) source if required and is readily optimized to run off the voltage of a couple of 12 volt car batteries upwards, for example in emergency use or in situations of erratic power availability. A form of UPS (uninterruptable power supply) operation is thereby easily created using the fundamental design of motor control 10.

The variable voltage/power factor corrector circuit 500 provides a variable output voltage from 0 to approximately 300 Volts (single phase supply), which is achieved using two clock/timer/comparators 526 and 528 configured to edge trigger, under control of an opto-coupler 530. Clock/timer/comparator 526 and 528 and opto-coupler 530 may together be referred to as a pulse width modulator (PWM) 540. PWM 540 operates so as to switch a rising or falling current, at a desired dV/dT, so that precisely the desired amount of charge (energy) is switched or drawn by transistor 570. The voltage and stored charge on capacitor 554 may be ramped up gradually by increasing the duty cycle of pulse width modulator (PWM) 540 from zero to the level desired.

Circuitry 515 is configured for continuous current (low ripple) flow from mains supply 550 and this is achieved by using two windings on one coil assembly 556 and by capacitor 552. This topology also limits switching voltage transition across transistor 570 to the peak value of incoming AC voltage irrespective of the output 590 voltage of the circuit.

A further advantage of capacitor 552 is that any high frequency ripple current is contained within the components of the dynamic reservoir 515. In addition commutating diode 524 does not experience any turn on spikes or surge current.

Pulse width modulator circuit 500 is connected to the live terminal of the bulk storage capacitor 554, thus minimising EMC and dV/dt transients for level shifting between control circuit FIG. 6 and this circuit.

The current of switching device 570, commutating diode 524 or output current drawn by multiphase output stage are all readily accessible, for monitoring and control purposes, by their individual currents all flowing through a common point formed at current measuring resistor 558 at the zero volt terminal of 590.

Capacitors 560 and 562 are arranged to smooth low voltage supply to 540 and capacitor 564 sets the pulse repetition frequency of the circuit.

It is appreciated that the low voltage power supply requirement of the PWM circuit 540 is supplied by the bootstrap action of the multiphase circuit in FIGS. 9 and 10. Furthermore the multiphase circuit does not have to be operational for the supply to be present. Low voltage power is available irrespective of the voltage that the variable voltage power factor correction circuit is providing and at what frequency the multiphase drive is running. Capacitor 560 is of such a value that it can store enough energy to maintain the circuit 540 at the lowest frequency of operation of the drive.

To optimise the power factor of the current drawn by this circuit at any input voltage and output voltage, the current amplitude is varied continuously during each mains half cycle.

Figure 21:
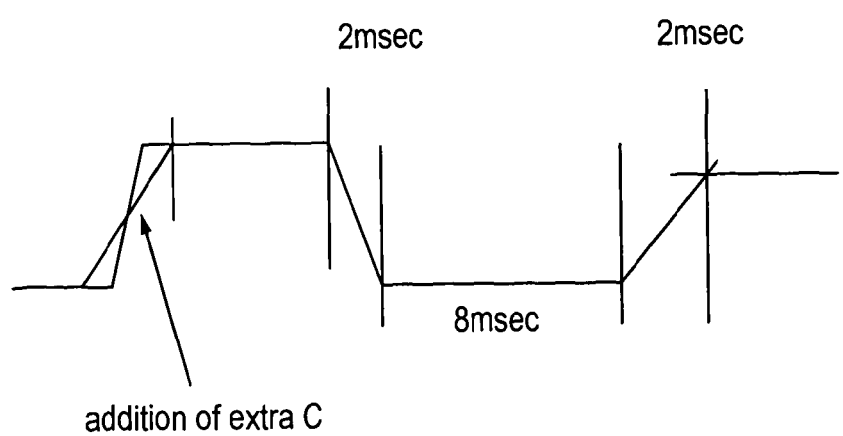
FIG. 21 is a waveform diagram showing effect of increasing slope limiting capacitor.

In use, if the current is kept at a substantially constant level over each half cycle, the power factor can readily achieve or exceed 0.9. This is the case for the simple analogue and hardware design used to illustrate the operation of the drive 10. However, if the current level is modulated by the amplitude of the mains input 550 half cycle at any given point on the half cycle, then an even greater power factor closer to 1.0 can be obtained. This is ideally achieved using a microprocessor/microcontroller in the control circuitry to both implement the function of the simple analogue and hardware design and at the same time modifying the duty cycle of PWM 540 continuously via opto-coupler 530 or similar link, for example, as shown in FIG. 21.

It is possible, under normal motor operating conditions of part load or reduced speed, to alter the current I 551 so that the circuit 500 draws less current near the mains voltage peaks thus assisting with power factor correction overall on the mains supply to which the drive 10 is connected.

If additional output voltage (in excess of the incoming mains voltage) is required, the circuit 500 can be modified by the addition of an extra switching stage to boost an incoming voltage while still maintaining a high power factor or even increasing it.

Alternatively a simple low cost but effective way is to use an auto transformer (not shown) at the input of the motor drive to give typically a 10 to 15% increase in incoming AC voltage. Being an auto transformer, the overall efficiency can be very high, with losses of typically 0.5% to 1% at full power and with similar or less losses than a semiconductor based boost circuit as described above. A 1 kW drive typically requires a 100 Watt auto transformer to provide an extra 10% voltage. If the autotransformer loss itself was 7 watts, this represents an overall efficiency of 99.3%.

The use of an autotransformer in this position also has a beneficial effect on the drive power factor at any given point, by effectively increasing the proportion of the available sine wave for the variable voltage/power factor correction circuit to operate over. This helps in the drive power factor becoming as near 1.0 as possible and consequently reduces the need of any external power factor correction with its attendant costs and power losses.

FIG. 6 is a circuit diagram of voltage controller and shows a controller 600 which adjusts the variable voltage power factor corrector circuit in FIG. 5. The control circuitry may be implemented in either discrete analogue and/or digital components or by using a microprocessor/microcontroller or a combination of both. In the embodiment shown in FIG. 6, discrete analogue and digital components are shown in order to identify the steps that are used.

The essence of the operation of the controller 600 is both to set and control the current I 551 for optimum power factor of the current drawn from the mains while ensuring that the current flowing into capacitor 554 exactly balances the current drawn by the multiphase drive 900 or 1000 at the voltage $V_{RV}$.

In its simplest form induction motor 30 to be controlled requires a waveform voltage and frequency that are directly related to each other. For example it would require a 240 Volt waveform at 50 Hz, a 120 Volt waveform at 25 Hz, a 60 Volt waveform at 12.5 Hz and so on. This relationship is governed by physical characteristics of the motor.

Referring again to FIG. 6, to achieve optimum speed, a dual gang variable resistor or potentiometer 610 is connected to inputs 'A', 'B' and 'C' and varied in order to set the voltage of the waveforms applied to the motor (not shown). Output voltage 680 of this control circuit is used to set the voltage of the power factor correction circuit (FIG. 5). The other gang of 610 is used to set the frequency of waveforms supplied to the motor and generated by drive circuit 7 (for the single phase motor) or drive circuit 8 (for the three phase motor). The values of the potentiometer are chosen so that the drive voltage and frequency track each other.

Circuit 600 adjusts the pulse width modulation (PWM) of the drive waveform input into the power factor correction circuit and thus acts as a feedback loop to define both the output voltage at 590 and the current drawn at 550.

The output of operational amplifiers 615 and 620, which are cascaded, provides a signal that varies the mark-space ratio of the PWM 540, so as to provide a voltage controlled direct current power supply, in conjunction with the pulse width modulator circuit 500. Thus, as the potentiometer 610 is varied, there is a self-stabilising effect on the current flowing through op-amp 615 and a direct control of the amount of energy that is extracted from input waves.

Inclusion of circuit 600 enables direct power factor correction and measurement, as the control circuit has easy access to input voltage, input current and time. This is ideally done by a microprocessor in this position.

FIG. 7 is a circuit diagram of motor controller logic, suitable for a single phase motor. It derives input power from low power supply 400. The circuitry may be implemented either in a design using discrete analogue and digital components or by using a microprocessor/microcontroller or a combination of both. In the embodiment shown in FIG. 7, discrete analogue and digital components are shown in order to identify the steps that are used.

In the circuit shown in FIG. 7 there is an oscillator 701, and three clocked flip-flops 702-704. The flip-flops are decoded by two sets of four logical NAND gates 750-753 and 760-763, so that correct waveforms are switched at desired instants to respective windings as and when needed.

The motor 30 in a single phase circuit is not driven by symmetrical voltages and currents because the windings are not symmetrically connected and the phase angles are 90 degrees apart.

The flip-flops in 788 are arranged in such a manner as to generate the desired waveform at the required 90° phase shift, whilst oscillator 701 provides the required frequency.

Circuit 780 decodes the output of the flip-flops 760, 761, 762 and 763 so that the output switching devices are turned on and off in such a manner that there is a significant delay, (which is typically 200 microseconds), where both the switching devices of one output to the motor 30 are off at the same time. This is to firstly ensure that there is no possibility of 'shoot through' currents in multiphase output switching devices 940, 948, 960, 968, 980, 988, 1040, 1048, 1060, 1068, 1080, 1088 and secondly to allow any inductive current in the motor 30 to commutate the output from one supply rail variable volts at level $V_{RV}$ to an other supply rail 0 volts internal. Capacitor 782 provides local power supply decoupling if required.

FIG. 8 is a circuit diagram of motor controller logic, suitable for a three phase motor. It derives input power from low power supply 400. Control circuitry may be implemented in a design either using discrete analogue and digital components or by using a microprocessor/microcontroller or a combination of both. In the embodiment shown in FIG. 8, discrete analogue and digital components are shown in order to identify the steps that are used.

FIG. 8 shows an oscillator 810 connected to flip-flop 812 to ensure that the clock signal has an equal mark-space ratio. Shift register 870 is arranged to divide by 6. There are three flip-flops 814, 816 and 818 respectively and these are decoded by three sets of three logical NAND gates 831-839, so that correct waveforms are switched to respective windings as and when needed.

The motor 30 in a three phase circuit is driven by symmetrical voltages and currents because the windings are symmetrically connected and the phase angles are 120 degrees apart.

The flip-flops 814, 816 and 818 are arranged in such a manner as to generate the desired waveform at the required 120 degrees apart, the oscillator 810 providing the correct frequency required.

The NAND gates 831-839 decode the output of the flip-flops 814, 816 and 818, so that the output switching devices are turned on and off in such a manner that there is a significant delay, typically 200 microseconds, where both the switching devices for example 1040 and 1048 of one output 1010 to the motor 30 are OFF at the same time. This is to firstly ensure that there is no possibility of 'shoot through' currents in the multiphase output switching devices and secondly to allow the inductive current in the motor 30 to commutate the output from one supply rail to the other supply rail for example from variable volts to 0 volts internal. Capacitor 820 provides a local power supply decoupling if required.

FIG. 9 is a circuit diagram of a multi-phase drive circuit, suitable for a single phase motor. The slow rise and fall time, of the voltage applied to the motor 30 windings, is achieved by capacitors 912, 922 and 932 connected across each winding of motor 30 and to use stored back electromotive force (EMF) in the motor 30 itself to commutate the voltage from one voltage rail to the other voltage rail, for example from variable volts to 0 volts internal, of the multiphase output circuit.

Looking at one of the outputs in more detail, commutation of output 910 is achieved by switching off conducting transistor 948, waiting for the voltage on the output 910 to reach the voltage on rail variable volts; and then turning on a transistor 940 in order to maintain the output 910 at this rail voltage until the next transition is required, at which time, the process is repeated in the opposite direction/order.

In this example, a fixed time is allocated for the voltage to commutate the capacitor 912 before the transistor 940 is turned on. An alternative approach is to measure the voltage on output 910 and when it reaches rail variable volts the transistor 940 is then turned on. This is readily accomplished, for example, using a microprocessor with analogue inputs to measure the voltages.

Advantages of this method of operation are that the output switching devices are turned off and on with no switching losses and the transition dV/dt on the winding is about 2 volts per microsecond and therefore there are minimal EMC issues. Thus it is no longer necessary to employ screened cable and the electrical 'stress' (typically giving rise to degradation of insulators) on the motor windings is only minimally increased from the levels of electrical 'stress' when connected directly to the mains.

The single phase version is a more complicated variant of the multiphase drive and is described in greater detail below. The single phase multi phase drive 900 uses non identical capacitors 912, 922, 932 on each output 910, 920, and 930 to obtain similar commutation times of the outputs to that achieved in the three phase motor drive 1000. The single phase drive 900 may require the use of an active slew rate function provided by capacitors 982 and 984 in the circuitry connected to output 930 if the inductive current from motor 30 is very small at the time of switching. This is due to the non-symmetrical nature of the currents flowing in the windings of a single phase motor.

The net effect of this is the back EMF stored in the motor 30 presents itself differently on each terminal. Terminal 910 behaves like the three phase motor (described below); the second terminal 920 has a back EMF value of about 60% of the first terminal; and the third terminal 930 has a very low back EMF. Consequently the capacitor value 922 is about 60% of the value of capacitor 912 and the output circuit to the third terminal 930 is different and the capacitor 932 is very small or not fitted.

The circuit 900 has an active slew rate to commutate the output from one rail 990 to another 992 rather than using a capacitor 932 across winding (not shown).

Both the switching device 980 (top) and switching device 988 (bottom) have active slew rate limiting on turn on. This is achieved by capacitor 982 for switching device 980 and capacitor 984 for switching device 988. This active slew rate limiting mechanism is potentially more wasteful in energy than the output capacitor mechanism, but in reality the current flowing at this point of switching is very low with consequence that only very small switching losses are incurred.

The drive to the switching devices 980 and 988 is arranged in such a manner that it still turns off the switching device 980 or 988 very quickly by clamping the effect of the slew rate capacitors 982 and 984 respectively. This is facilitated by switching device 986 for the device 980 and the diode 987 for the device 988.

The multiphase circuit is essentially three half bridge drives 940 and 948, 960 and 968 and 980 and 988. Considering one of these, a totem-pole arrangement of transistors 940 and 948 has a centre tap 910 to a terminal for each of the three phases. Transistors are bi-polar field effect transistors (FETs) or integrated field effect transistors (IGFETs) and are optimised for low frequency operation. A slew rate capacitor 912 connects the output line 910 to ground 992

The bottom switching device 948 is operated by the logic signal from 780 in FIG. 7. The top switching device 940 is also operated by the appropriate logic signal from 780 in FIG. 7 and the signal goes through level shifting component 946 and this is ideally DC coupled for reliability and not edge triggered.

A floating low voltage power supply capacitor 943 is provided by current flowing through diode 944 from the low voltage power supply circuit whenever switching device 948 is switched on. The capacitor 943 has a dual function in that it also supplies part of the current required by the circuit 500. This power is transferred from capacitor 943 to capacitor 560 in the variable voltage power factor corrector when top switching device 940 is switched on by the diode 945 being forward biased to conduct.

Capacitor 943 is of such a value that it can store both enough energy to maintain the drive to switching device 940 and keep it firmly in its 'on' state at the lowest frequency of operation of the drive, as well as providing at least one third of the power required to operate the circuitry 540 in the VV/PFC circuit.

Each top leg of the multiphase output contributes power to the VV/PFC circuit when the appropriate top leg switching device is on.

In the particular case where there is no voltage supplied to the motor the variable voltage/power factor correction circuit output voltage will be at zero and the low voltage supply will flow directly through diode 944 and diode 945 to capacitor 560 in the variable voltage/power factor correction circuit.

The voltage amplitude of the multiphase output is set by the output value of the variable voltage/power factor correction circuit (as described above with reference to FIG. 5). Because of the non-symmetrical nature of the single phase motor, each of the three legs of the multiphase drive may have a different waveform in terms of pulse position and pulse width. This has the effect of altering the motor coil current amplitudes and phase relationship with each other. The logic circuit 700 in FIG. 7 only provides equal amplitude and 90 degree phase relationship. A more sophisticated, discrete component system, could achieve this or it could be done quite easily in software with a microcontroller performing the function of the logic circuit 700.

FIG. 10 is a circuit diagram of a multi phase drive circuit, suitable for a three phase motor. The slow rise and fall time is achieved by capacitors 1012, 1022, 1032 connected across each winding and to use stored back electromotive force (EMF) in the motor itself to commutate the voltage from one voltage rail to the other voltage rail of the multiphase output circuit.

As with the single phase drive, commutation of an output is achieved by, for example, turning off the conducting transistor 1048, waiting for the voltage on the output 1010 to reach that voltage on another rail variable volts and then turning on a transistor 1040 in an output limb to maintain the output 1010 at this rail voltage $V_{RV}$ until the next transition is required when the process is repeated in the opposite direction/order.

In this example, a fixed time is allocated for the voltage to commutate the capacitor 1012 before the transistor 1040 is turned on. An alternative approach is to measure the voltage on output 1010 and when it reaches rail variable volts the transistor 1040 is then turned on. This is readily accomplished, for example, using a microprocessor with analogue inputs to measure the voltages.

Again the advantages of this method of operation are that the output switching devices are turned off and on with no switching losses and the transition dV/dt on the winding is about 2 volts per microsecond and therefore there are minimal EMC issues. Thus it is no longer necessary to employ screened cable and the electrical stress on the motor windings is only minimally increased from the levels of stress when connected directly to the mains.

The three phase version is the simpler variant of the multiphase drive and is described in greater detail below. The three phase version uses identical capacitors 1012, 1022, 1032 on all outputs 1010, 1020, 1030 to obtain commutation of the outputs in the three phase motor. This is due to the symmetrical nature of the currents flowing in the windings of a three phase motor.

The net effect of this is the back EMF stored in the motor presents itself the same on each terminal. The same conditions apply to terminals 1010, 1020 and 1030. Consequently the capacitor values 1022, 1012 and 1032 are the same.

The multiphase circuit is essentially three half bridge drives. Considering one of these, a totem-pole arrangement of transistors 1040 and 1048 has a centre tap 1010 to a terminal for each of the three phases. Transistors are bi-polar field effect transistors (FET) or integrated field effect transistors (IGFET) and are optimised for low frequency operation. A slew rate capacitor 1012 connects output line 1010 to ground 1092

Bottom switching device 1048 is operated by a logic signal from one of the groups of logic gates 831-839 in circuit 800 in FIG. 8. The top switching device 1040 is also operated by the appropriate logic signal from 800 in FIG. 8 and the signal goes through level shifting component 1046 and this is ideally DC coupled for reliability and not edge triggered as is the case for many designs of level shifters.

A floating low voltage power supply capacitor 1043 is provided by current flowing through diode 1044 from the low voltage power supply circuit whenever switching device 1048 is switched on.

Capacitor 1043 has a dual function in that it also supplies part of the current required by the circuit 500. This power is transferred from capacitor 1043 to capacitor 560 in the variable voltage/power factor corrector when top switching device 1040 is on by the diode 1045 being forward biased to conduct.

Capacitor 1043 is of such a value that it can store both enough energy to maintain the drive to switching device 1040 and keep it firmly in its 'on' state at the lowest frequency of operation of the drive as well as providing at least one third of the power required to operate the circuitry 540 in the variable voltage/power factor corrector circuit.

Each top leg of the multiphase output contributes power to the variable voltage/power factor corrector circuit when the appropriate top leg switching device is on.

In the particular case where there is no voltage supplied to the motor the variable voltage/power factor corrector output voltage will be at zero and the low voltage supply will flow directly through diode 1044 and diode 1045 to capacitor 560 in the variable voltage/power factor corrector circuit.

The voltage amplitude of the multiphase output is set by the output value of the variable voltage/power factor correction circuit (described above with reference to FIG. 5). Because of the symmetrical nature of the three phase motor, each of the three legs of the multiphase drive will have a similar waveform in terms of pulse position and pulse width. Logic circuit 800 in FIG. 8 only provides equal amplitude and 120 degree phase relationship. A three phase motor may have small discrepancies between each winding and in the pursuit of maximum electrical efficiency it may be desirable to amend the timing of the three drive waveforms. This has the effect of altering the motor coil current amplitudes and phase relationship with each other. A more sophisticated discrete component system could do this or it could be done quite easily in software with a microcontroller performing the function of the logic circuit 800.

The voltage amplitude of the multiphase output is set by the output value of the variable voltage power factor correction circuit (described above with reference to FIG. 5). Because of the symmetrical nature of the three phase motor, each of the three legs of the multiphase drive is identical.

The principle upon which the multiphase output works is to provide the motor 30 with a modified square wave at the correct frequency and voltage to each winding and at 120 degrees phase difference apart, which is at the operating frequency of the motor, whilst providing a suitable path for stored charge to flow to a reservoir 1012, 1022, 1032 or 554, rather than dissipate as heat.

Figure 11:
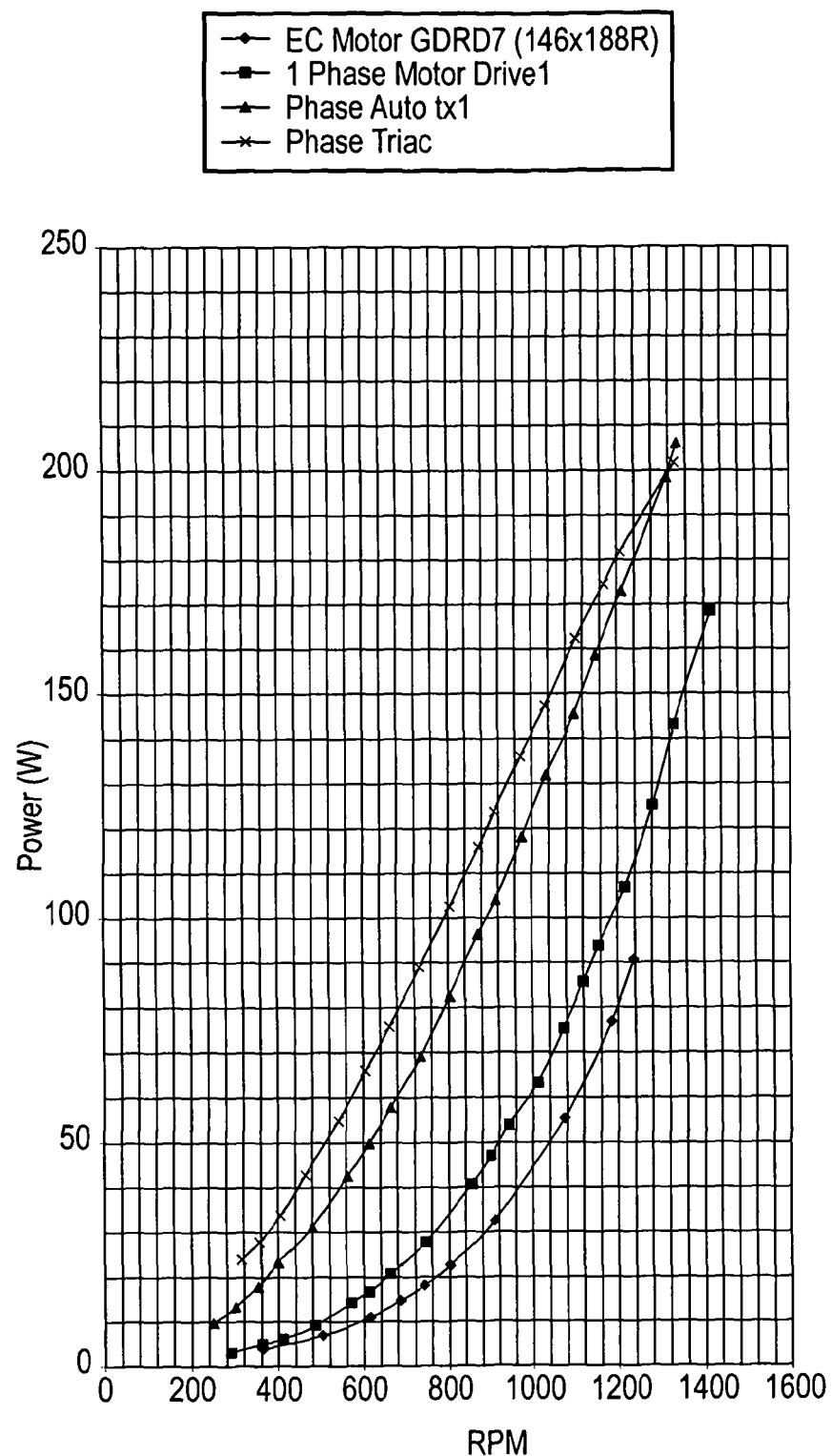
FIG. 11 is a graph of power consumption of various motors with different types of speed controllers.

FIG. 11 shows a graph of the power consumed for a typical fan with a single phase motor controlled by several different methods including the proposed single phase drive, a three phase motor controlled by the proposed three phase drive and an electrically commutated motor.

Figure 18:
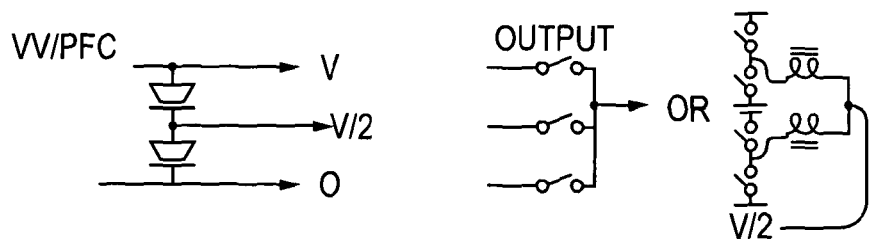
FIG. 18 is a circuit diagram of split capacitor rail.
Figure 20:
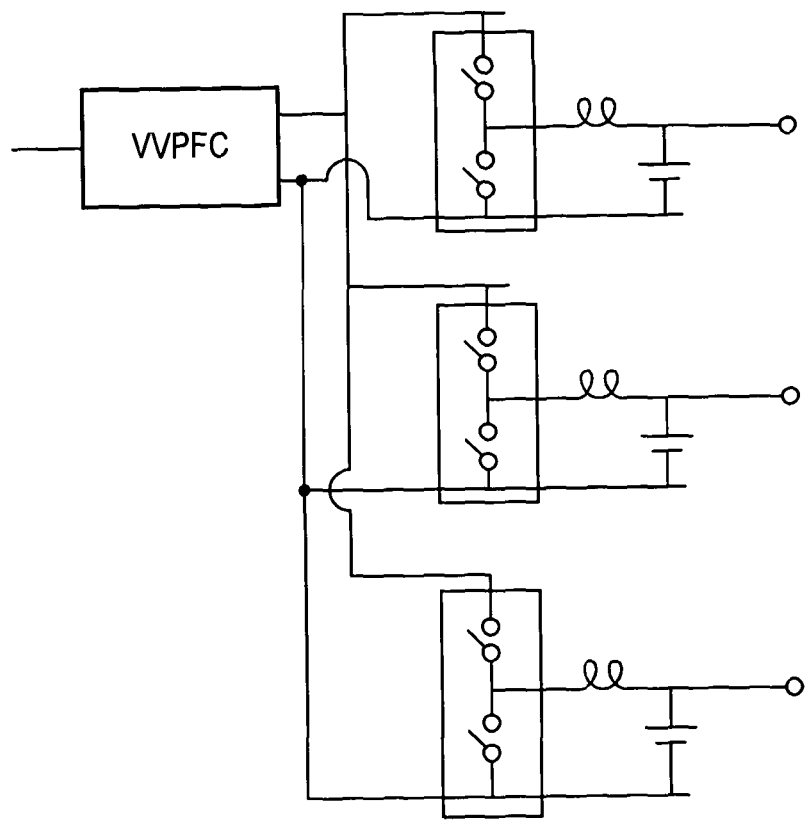
FIG. 20 is a circuit diagram showing variable voltage sine wave output topology.

It is apparent that by applying two different but interrelated waveforms the efficiency of operation of single-phase motors can be significantly improved using the proposed single phase drive. For even greater efficiency improvement, an option is to apply separate waveforms to each motor winding and this may further enhance operation as any slight variations can be accommodated by use of independent wave shaping. The improvement in efficiency that this gives needs to be balanced by the increase in cost and complexity of the drive circuitry that this would require. This could be split rail operation as per FIG. 18 or sine wave operation as per FIG. 20.

For example, in addition to the abovementioned modified drive current, motor losses are reduced by use of the speed controller and one or more of the following:
1. Optimising the waveform frequency;
2. Varying the voltage applied to each winding by up to ±10%;
3. Adjusting the phase relationship between each winding;
4. Shaping the form of the input wave;
5. Reducing losses arising from ancillary components;
6. Continuously measuring all variables 1 to 4 (inclusive) so as to operate in optimum conditions and to monitor and adjust the variables so as to minimize the consumption of energy by the control system.

Software is ideally accessed by the logic driver to perform one or more of these functions and, whilst a system, with a motor, is in operation, the logic driver that may replace the circuitry and function of FIGS. 6, 7 and 8 combined, can be configured to perform other calculations so as to seek alternate values of variables at which energy consumption may be lower than that of any given operation Referring briefly to FIGS. 9 and 10, which show a single phase driver and a three phase driver in which like components bear the same reference numerals, it is apparent that logic driver FIGS. 7 and 8 operate in a similar manner and can be configured with suitable software to drive either a single or three phase speed controller.

Furthermore software in the drive 10 may be used to identify and control switching from one set of operating conditions to another, whereby a preferred strategy is in operation and the switching is also performed at minimum energy loss.

Dynamic memory may be used to store values of variables of the operation of the driver 10 according to whether single or multi-phase power supply is being used.

Efficiency improvements and drive configurations. There are three main drive configurations.

Figure 13:
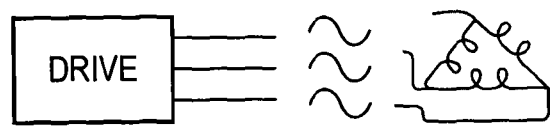
FIG. 13 is a circuit diagram of a sine wave output drive.

Firstly, induction motors run most efficiently on pure sine waves (FIG. 13) of the correct voltage, frequency and phase applied to each of the motor windings. To do this the output of the drive has to be a relatively pure sine wave and the mechanism to produce this sine wave incurs a certain amount of efficiency losses.

Figure 14:
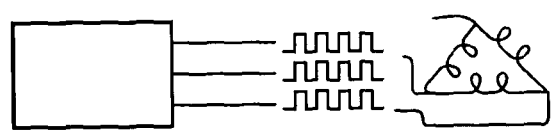
FIG. 14 is a circuit diagram of a conventional 3 phase drive.

Secondly, conventional motor drives in the public domain (FIG. 14) apply a high frequency (2 to 20 kHz) square wave of variable mark-space to each winding, the average of this being the desired voltage, frequency and phase to each winding and this can result in near sine wave currents being achieved. Because the drive is outputting a high frequency square wave, the drive losses are lower than the sine wave output drive above but the motor itself has efficiency losses due to the high frequency edges and the basic unsuitability of motor design, windings and steels to high frequency operation.

Thirdly, the drive described provides a modified square wave of the correct voltage, frequency and phase to each winding. The winding current though containing the desired fundamental sine wave current also contains other harmonics that may result in inefficient operation. Experimental work has shown that overall losses between the mains power in and the shaft power out of the three drive techniques above are comparable.

Figure 15:
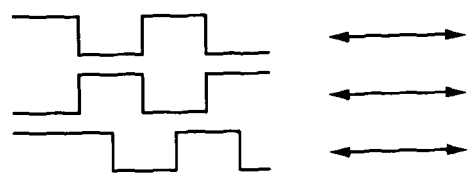
FIG. 15 shows the relationship of waveforms and phase.
Figure 16:
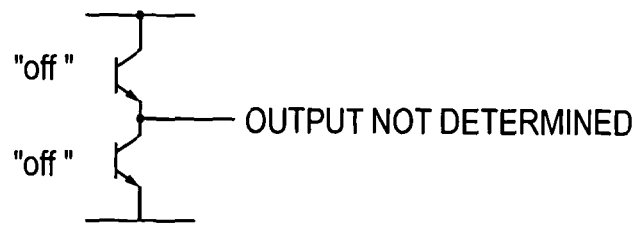
FIG. 16 is a circuit diagram illustrating 'tristate' output.
Figure 17:
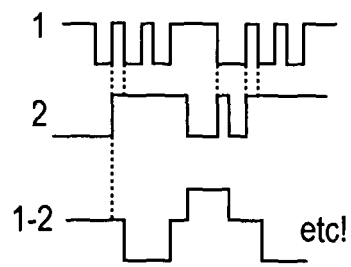
FIG. 17 is a waveform diagram showing extra pulse for period lengthening.

However, the proposed drive is a lower cost solution overall and the timing of the quasi square waves may be altered to improve the overall efficiency of the motor and drive combination. This is done by adjusting the relative phasing of each of the square waves applied to the windings of the motor. It is possible (FIG. 15) to adjust the relative voltage of each winding independent of the phase or to adjust the phase independent of the voltage or any combination of phase and voltage as required. The nominal motor voltage is set by the VV/PFC circuit. It is also possible to 'tri-state' (FIG. 16) any one of the individual drive sections to each winding by ensuring both the top and bottom switching device are held off together for the desired period of time. This will effectively open circuit the winding at any point of the waveform which has the effect of either extracting energy or preventing energy being extracted from that winding depending on timing and current flows. It is also possible to add extra transitions (FIG. 17) to the part of the drive controlling the opposite end of the winding to reduce or extend the time period of the waveform of one winding relative to the other.

One or a combination of these techniques gives efficiency improvement in specific motors.

Other methods for efficiency improvement and/or cost improvement of the total drive system include:

Firstly, by employing of a half voltage capacitive tap on the VV/PFC circuit output capacitor (FIG. 18) either as a fixed connection to one end of a winding or as a half rail supply to the output circuit.

Figure 19:
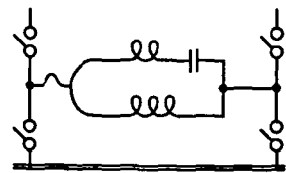
FIG. 19 is a circuit diagram of wiring to single phase motor including series capacitor.

Secondly, by employing a capacitor in series (FIG. 19) with one winding like the usual capacitor run single phase induction motor connection but provide a quasi square wave drive with variable frequency and voltage as already described.

Thirdly by providing a relatively pure sine wave outputs (FIG. 20) from the drive using PWM at typically 15 to 30 kHz and integral output filters, the sine shaping being done by the output stage and the main voltage control of the output being done by the VV/PFC circuit. The output stage can be used for minor voltage trimming if required.

Fourthly, by adjusting the values of the slew rate limiting capacitors (FIG. 21) to values in excess of what is required to limit the winding dV/dt with the intention of turning the quasi square waveforms in to a more sinusoidal shape thus reducing the ratio of harmonics to the fundamental frequency of the waveform.

Figure 22:
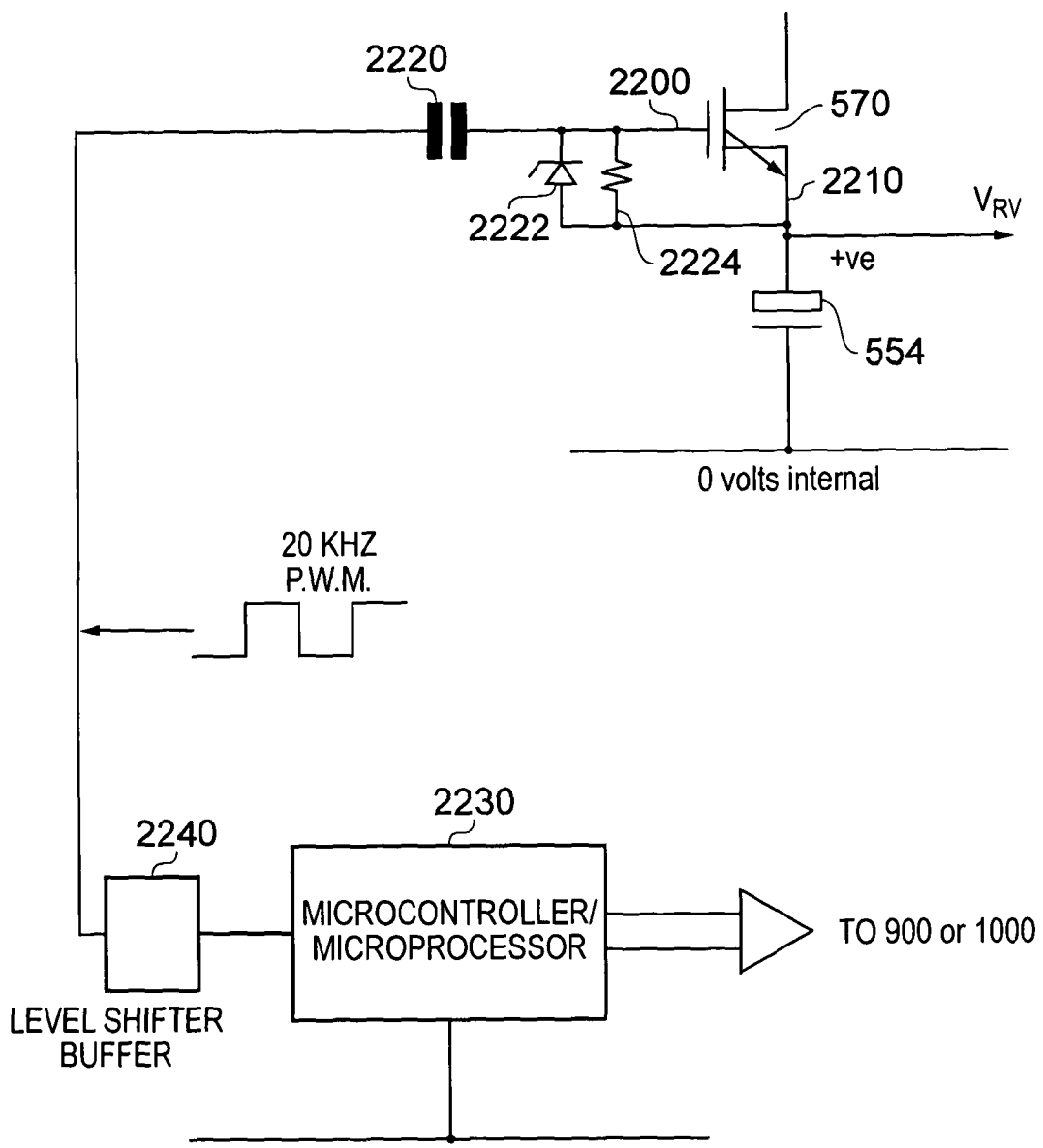
FIG. 22 is a circuit diagram of an alternative drive arrangement to variable voltage power factor corrector circuit.

FIG. 22 is an alternative method to provide gate drive to transistor 570. Because the source terminal 2210 of 570 is referenced to the positive terminal of capacitor 554 and the maximum voltage change with time of capacitor 554 is in the order of volts per millisecond and the gate drive itself is nominally at least 20 kHz it is possible to choose a value of capacitor 2220 typically 10 to 33 nF which will transfer the gate drive power, voltage and waveform to the gate terminal 2200 of 570 while not unduly influencing the gate operation as the voltage across capacitor 554 varies. This capacitor 2220 requires a voltage rating of at least 400 volts.

The other end of the capacitor 2220 may be connected directly, for example, to a microprocessor 2230 via level shifter/buffer 2240 as required. The level shifter/buffer 2240, if used, converts microprocessor 2230 5 volt outputs to 12 volts suitable to drive transistor 570. A microprocessor, or alternative circuitry, with 12 volt outputs would not require level shifter/buffer 2240 to be fitted.

The microprocessor 2230 also provides timing for multiphase drive 900/1000 as previously described.

The microprocessor output to transistor 570 would be a PWM modulated digital waveform at nominally 20 kHz to set $V_{RV}$ on capacitor 554 as required while ensuring I 551 has the highest power factor possible.

Zener diode 2222 clamps voltage drive to gate for safety and also resets capacitor 2220 charge every negative transition of the PWM waveform. Resistor 2224 ensures transistor 570 is turned off in the event of no PWM drive.

An adaption of this method of capacitive drive could also be used to replace level shifting devices 946, 966, 986, 1046, 1066 and 1086.

Figure 23:
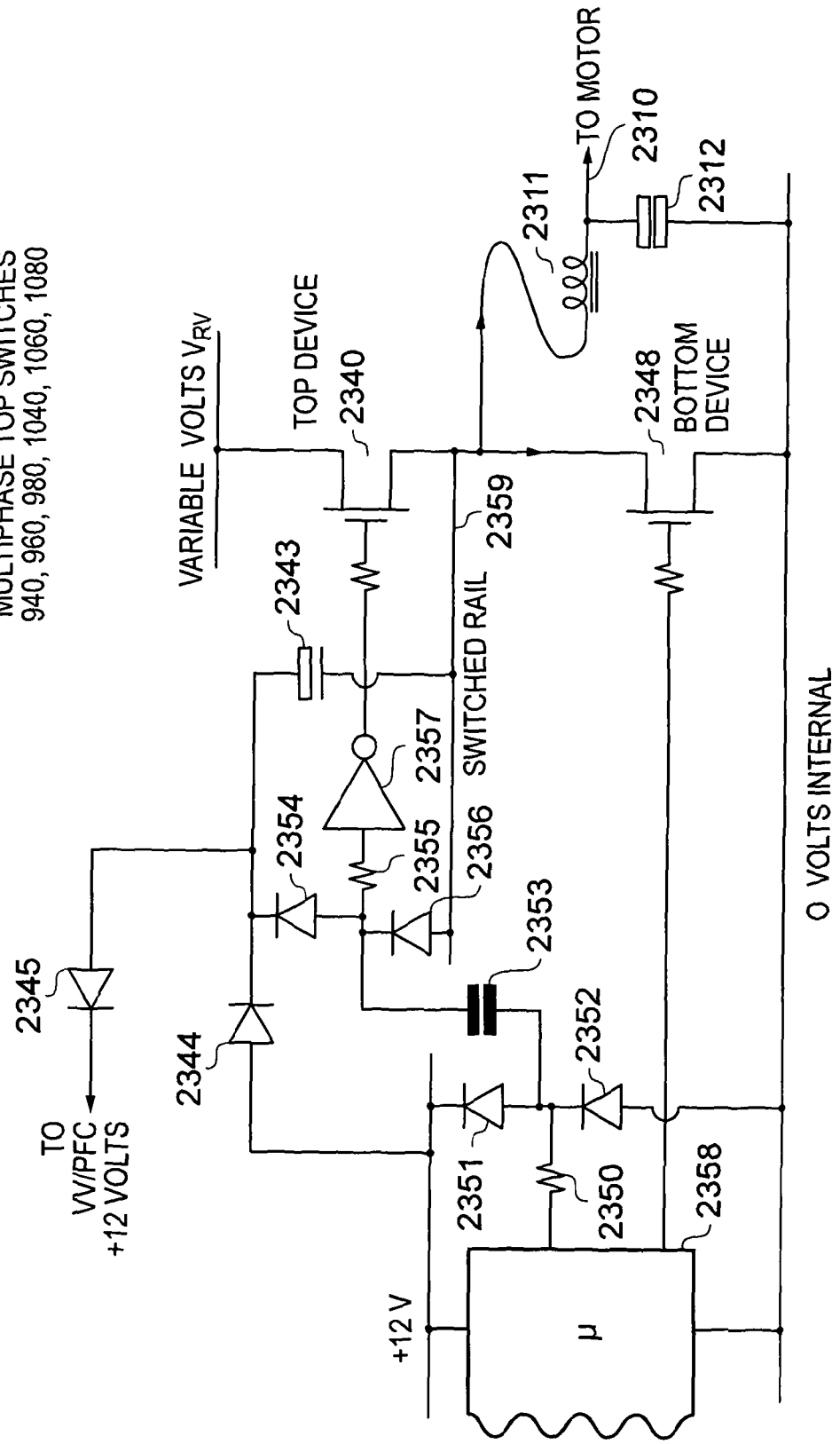
FIG. 23 is a circuit diagram of an alternative embodiment for providing gate drive to multiphase 'top' switching devices 940, 960, 980, 1040, 1060 and 1080.

FIG. 23 illustrates an alternative method for providing gate drive to multiphase top switching devices 940, 960, 980, 1040, 1060 and 1080. FIG. 23 is a generalised schematic of one channel of the multiphase drive 900 and 1000 and is suitable for both quasi square wave operation and high efficiency sine wave operation.

The unique way that the speed controller 10 operates allows for the safe handling of the 'illegal' state where both the top device 2340 and the bottom device 2348 are on at the same time on power up. This is because $V_{RV}$ is initially at zero volts and therefore there is no 'shoot through' current through devices 2340 and 2348. In use, microcontroller 2358, after power up, sets the bottom device 2348 off and by outputting a series of pulses via resistor 2350 will also initialise the top device 2340 to off as well. $V_{RV}$ is then set at the desired level required while the correct signals are applied to the inputs of 2340 and 2348.

Conventional level shifter circuits use a significant amount of current typically 10 mA per channel. This extra current burden on the power supply 400 entails that, in use that it would have to be a more costly and complex switch mode type power supply to minimise losses. The drive technique in FIG. 23 imposes a burden typically 0.2 mA per channel. Increasing the value of capacitor 2353 beyond the value necessary for correct circuit operation therefore actually returns power (charge) into capacitor 470 of the low voltage power supply 400. This would reduce the overall amount of power that the low voltage power supply 400 would have to output in order to operate all the circuitry in the speed controller 10.

The operation of the circuit in FIG. 23 occurs in three distinct phases. Considering the point where top device 2340 is already on, the output of inverter/buffer 2357 is high. The input to inverter/buffer 2357 is low. The voltage across capacitor 2353 is equal to $V_{RV}$ and the output from microcontroller 2358 via resistor 2350 is also low. It is now desired to turn top device 2340 and the first phase is to effect a low to high transition on resistor 2350. This low to high transition is communicated via capacitor 2353 (acting as a level shifter) to the input of inverter/buffer 2357. The output of 2357 turns off top device 2340. This causes switched rail 2359 to go from $V_{RV}$ to zero. The action of this is the second phase.

During the second phase, capacitor 2353 now performs two other functions. One is to keep the top device 2340 off during this voltage transition and the other is to provide power to the capacitor 2343. The top device 2340 is kept off by the displacement current of capacitor 2353 flowing through diode 2352 and 2354. Resistors 2350 and 2355 limit and protect the output of microcontroller 2358 and inverter/buffer 2357 from transient voltages and currents that occur during the voltage transition. The displacement current of capacitor 2353 is stored in capacitor 2343 ready to operate inverter/buffer 2357 to turn top device 2340 back on again. When the switched rail 2359 is at zero volts, the circuit is now in its third phase.

Bottom device 2348 is now turned on thus keeping switched rail 2359 at zero volts. The capacitor 2353 now returns to its original function as a mechanism ready to communicate a high to low transition to the input of inverter/buffer 2357 to operate the circuit in the reverse direction.

Turning top device on is the reverse operation of the procedure as described above. The displacement current of capacitor 2353 flows through diodes 2356 and 2351. This displacement current returns current into capacitor 470.

The circuit as described in FIG. 23 may be used both as quasi square wave drive and a sine wave drive. For square wave operation the inductor 2311 is replaced with a link and capacitor 2312 is of a value to obtain the correct slew rate on 2310. The frequency of operation of the switching of devices 2340 and 2348 is the motor drive frequency.

For sine wave output at 2310, the inductor 2311 is fitted and the capacitor 2312 value is chosen as a compromise between switching frequency ripple amplitude, conducted interference and motor dV/dt. Devices 2340 and 2348 are now modulated at a frequency, typically 20 kHz, with a variable PWM to achieve the desired sinusoidal waveform on output 2310.

Diode 2344 is fitted to charge capacitor 2343 when bottom device 2348 is on. Diode 2345 is fitted to charge low voltage supply of variable voltage power factor corrector 500 when top device 2340 is on. It is possible to increase the value of capacitor 2353 beyond a value required for optimum operation to the point where sufficient energy is transferred to capacitor 2343 to allow diode 2344 to be omitted or to provide a minimal amount of current as required.

A unique feature of this method of capacitive drive and the use of the variable voltage $V_{RV}$ is that the displacement current and energy available from capacitor 2353 stored in capacitor 2343 when the top device 2340 turns off can be made to match the quantity of energy required from capacitor 2343 in order to turn the top device 2340 back on again. This is because the energy required to turn the top device 2340 on to a great extent is due to the Miller capacitance in the switching device 2340 which is proportional to the voltage transition on the device 2340.

For the lowest cost and minimum component count solution it is possible to replace capacitor 2353 with capacitive coupling between areas on a printed circuit board and to rely on substrate diodes of microcontroller 2358 and inverter/buffer 2357, to provide a path for the displacement current of capacitor 2353 during the switching of devices 2340 and 2348.

The invention has been described by way of examples only and it will be appreciated that variation may be made to the above mentioned embodiments without departing from the scope of invention. With respect to the above description then, it is to be realised that the optimum component values, variations in size, materials, shape, form, function and manner of operation, assembly and use, are deemed readily apparent to one skilled in the art, and all equivalent relationships to those illustrated in the circuit diagrams and drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described.

The invention claimed is:

1. A motor controller to modify an input current to an alternating current (AC) motor, said motor controller comprising:
   a variable voltage output circuit adapted to be connected to an input power supply, to provide impedance conversion to said input power supply so that a controlled current is drawn from said input power supply,
   a drive voltage output circuit comprising half bridges with top and bottom transistors configured to operate as a single or a multi-phase power supply for said motor, each half bridge including a slew rate limiting capacitor connected to a junction of top and corresponding bottom transistors, an output of said drive voltage output circuit being connected to at least one winding of said motor in parallel with said slew rate limiting capacitors, so that said slew rate limiting capacitors apply a slew rate limited wave voltage to said motor to enhance lossless switching of said drive voltage output circuit; and a control circuit arranged to control an output voltage of said variable voltage output circuit, and to control a frequency of an output signal of said drive voltage output circuit;

wherein said variable voltage output circuit provides a variable voltage between a minimum and a maximum, across a capacitor and a terminal to an input of said drive voltage output circuit.

2. A motor controller according to claim 1, wherein:

said variable voltage output circuit further provides a power factor corrected input current waveform.

3. A motor controller according to claim 1, wherein:

said drive voltage output circuit comprises a switching device; and said variable voltage output circuit comprises a power supply and a transistor in series with a first input of said power supply and a first contact of said terminal to isolate said switching device from said power supply.

4. A motor controller according to claim 3, wherein:

a first input of said power supply is connected to a drain of said transistor, and a gate of said transistor is connected to one terminal of a bulk storage capacitor, and a second terminal of said bulk storage capacitor is connected to said power supply, so that said drive voltage output circuit and said switching device are isolated from said input power supply.

5. A motor controller according to claim 4, wherein said variable voltage output circuit comprises:

a dynamic reservoir having two windings on one coil assembly and a capacitor connected to a drain of a transistor, a diode, and a transformer comprising a first coil with a first coil input and a first coil output and a second coil with a second coil input and a second coil output;

wherein a first input of said power supply is connected to said first coil input and a second input of said power supply is connected to said second coil input, and said first coil output is connected to a drain of said transistor, and a sink of said transistor is connected to a cathode of said diode, and said second coil output is connected to an anode of said diode.

6. A motor controller according to claim 4, further comprising:

a pulse width modulator (PWM) that operates to switch a transistor and thereby control a ramp up of voltage on said bulk storage capacitor from ground level to a desired level.

7. A motor controller according to claim 1, wherein:

said drive voltage output circuit is arranged to switch voltage at an adjustable repetition rate in synchronism with a variable voltage provided to said at least one winding of said motor.

8. A motor controller according to claim 1, further comprising:

means for modifying an input of said variable voltage output circuit, so that a near unity power factor is presented to said power supply.

9. A motor controller according to claim 1, wherein said drive voltage output circuit is arranged to apply, in use, a voltage waveform to said motor from a group comprising:

sine waves, square waves, saw tooth waves, variants and combinations of the aforesaid waves.

10. A motor controller according to claim 1, having a single or multi-phase controller arranged to switch an input current to ground level for a predetermined and variable time duration.

11. A motor controller according to claim 1, further comprising:

means for providing harmonic information to provide an indication of a power factor.

12. A motor controller according to claim 1, wherein:

said motor is adapted to operate in a regenerative mode.

* * * * *